(12) United States Patent
Matsushima

(10) Patent No.: US 11,106,113 B2
(45) Date of Patent: Aug. 31, 2021

(54) IMAGE CAPTURING APPARATUS CONTROLLING MANUAL FOCUS OPERATION AMOUNTS BEFORE AND AFTER AUTOFOCUS, CONTROL METHOD THEREOF, AND STORAGE MEDIUM

(71) Applicant: CANON KABUSHIKI KAISHA, Tokyo (JP)

(72) Inventor: Shuichiro Matsushima, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 203 days.

(21) Appl. No.: 16/548,931

(22) Filed: Aug. 23, 2019

(65) Prior Publication Data
US 2020/0073205 A1 Mar. 5, 2020

(30) Foreign Application Priority Data
Aug. 29, 2018 (JP) .............................. JP2018-160598

(51) Int. Cl.
*G03B 13/36* (2021.01)
*H04N 5/232* (2006.01)
(Continued)

(52) U.S. Cl.
CPC ............. *G03B 13/36* (2013.01); *G03B 13/20* (2013.01); *G03B 13/32* (2013.01); *G03B 17/20* (2013.01); *H04N 5/23212* (2013.01); *H04N 5/23216* (2013.01); *H04N 5/23245* (2013.01); *H04N 5/232933* (2018.08); *G06F 3/0416* (2013.01);
(Continued)

(58) Field of Classification Search
CPC .......... H04N 1/00411; H04N 5/23212; H04N 5/232125; H04N 5/232127; H04N 5/23293; H04N 5/232933; H04N 5/232935; H04N 5/232939; H04N 5/232945;
(Continued)

(56) References Cited

U.S. PATENT DOCUMENTS

| 7,604,423 | B2 * | 10/2009 | Nagata | ................... | G03B 19/07 |
| | | | | | 348/375 |
| 2005/0168620 | A1 * | 8/2005 | Shiraishi | .......... | H04N 5/232123 |
| | | | | | 348/345 |

(Continued)

FOREIGN PATENT DOCUMENTS

| JP | 2015-118231 A | 6/2015 | |
| JP | 2015118231 | * 6/2015 | ............... G02B 7/08 |

*Primary Examiner* — Twyler L Haskins
*Assistant Examiner* — Akshay Trehan
(74) *Attorney, Agent, or Firm* — Cowan, Liebowitz & Latman, P.C.

(57) ABSTRACT

An image capturing control apparatus comprising: an AF instruction switch configured to receive an instruction to carry out AF; and at least one memory and at least one processor which function as: a display control unit configured to control a display of a first display item and a second display item for adjusting a focus amount, as a MF operation; and a control unit configured to carry out control so that: in an MF operation before AF, a focus position is moved by a respective amount in response to the first display item or the second display item being operated; and in an MF operation after the AF, the focus position is not moved in response to the second display item being operated, or the second display item is not displayed.

14 Claims, 13 Drawing Sheets

(51) Int. Cl.
  *G03B 17/20* (2021.01)
  *G03B 13/32* (2021.01)
  *G03B 13/20* (2021.01)
  *G06F 3/041* (2006.01)
  *G06F 3/0484* (2013.01)
  *H04N 1/00* (2006.01)
(52) U.S. Cl.
  CPC ........ *G06F 3/0484* (2013.01); *H04N 1/00411* (2013.01)
(58) Field of Classification Search
  CPC .... H04N 5/23216; G03B 13/36; G03B 13/20; G03B 13/32; G03B 17/20; G06F 3/0416; G06F 3/0484
  USPC ........................ 348/345, 346, 333.01–333.04
  See application file for complete search history.

(56) References Cited

U.S. PATENT DOCUMENTS

| | | | |
|---|---|---|---|
| 2009/0073304 A1* | 3/2009 | Kumagai | H04N 5/23218 348/345 |
| 2010/0134433 A1* | 6/2010 | Miyanishi | G06F 3/016 345/173 |
| 2016/0073030 A1* | 3/2016 | Park | H04N 5/23293 348/207.11 |

\* cited by examiner

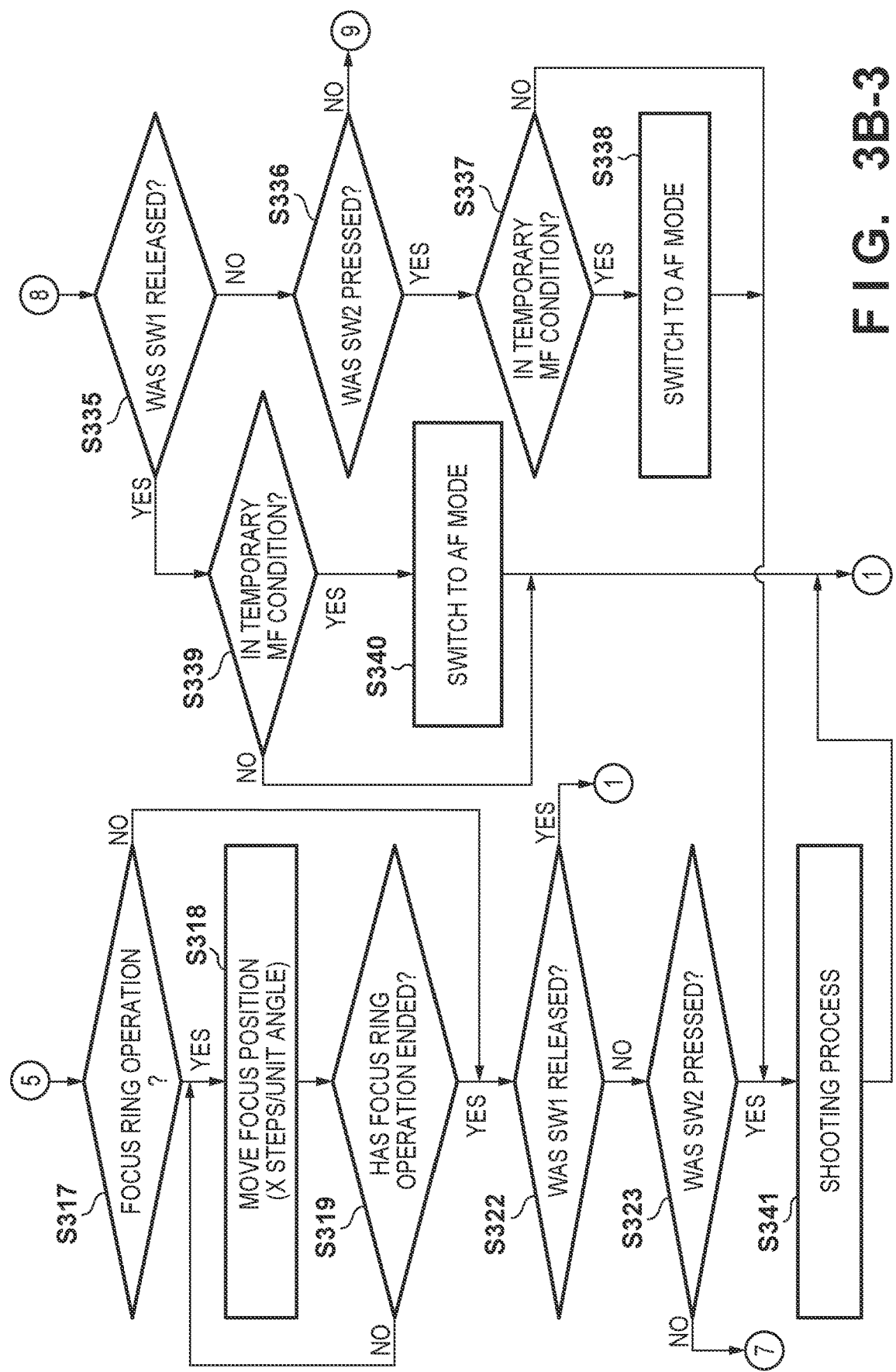

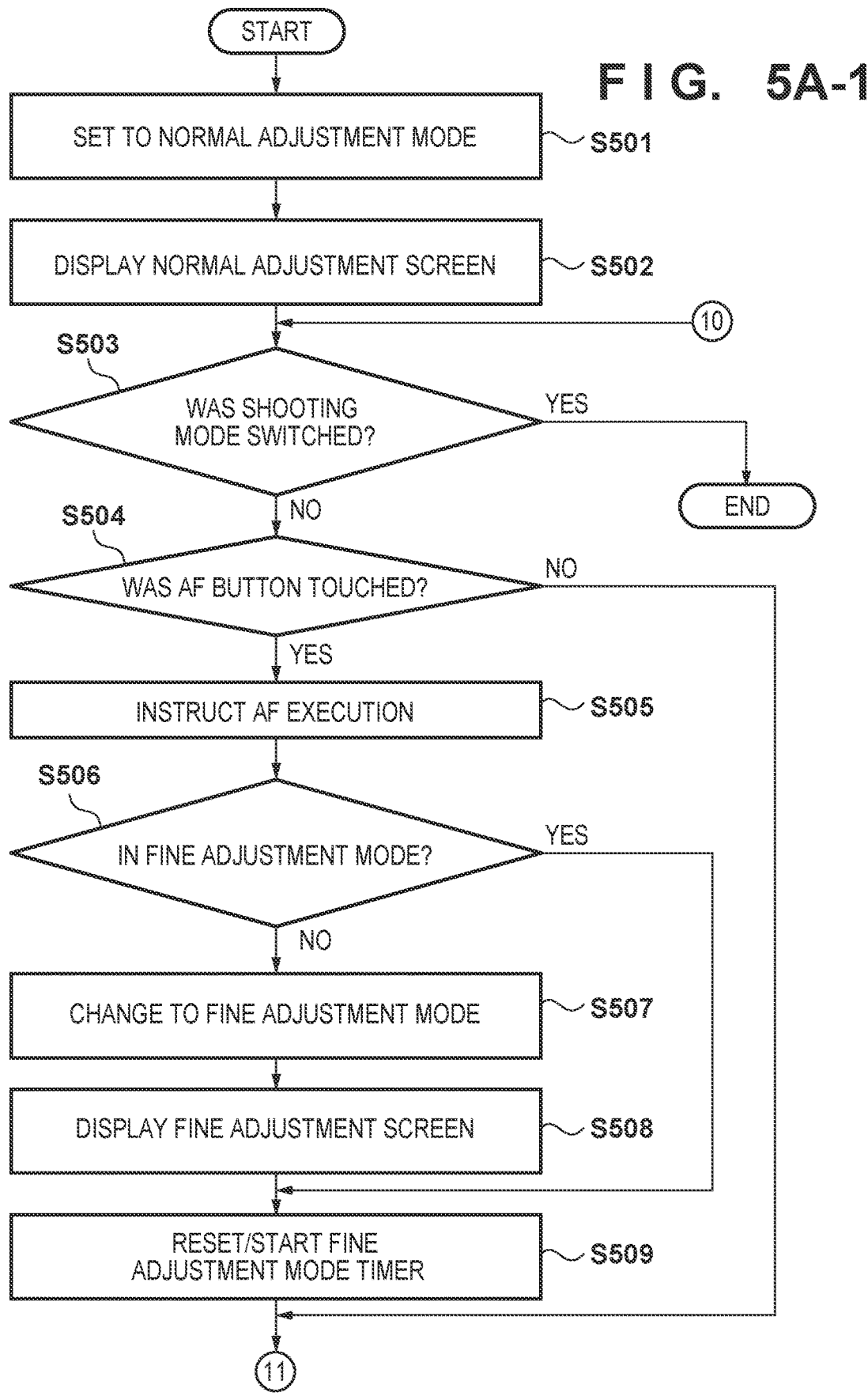

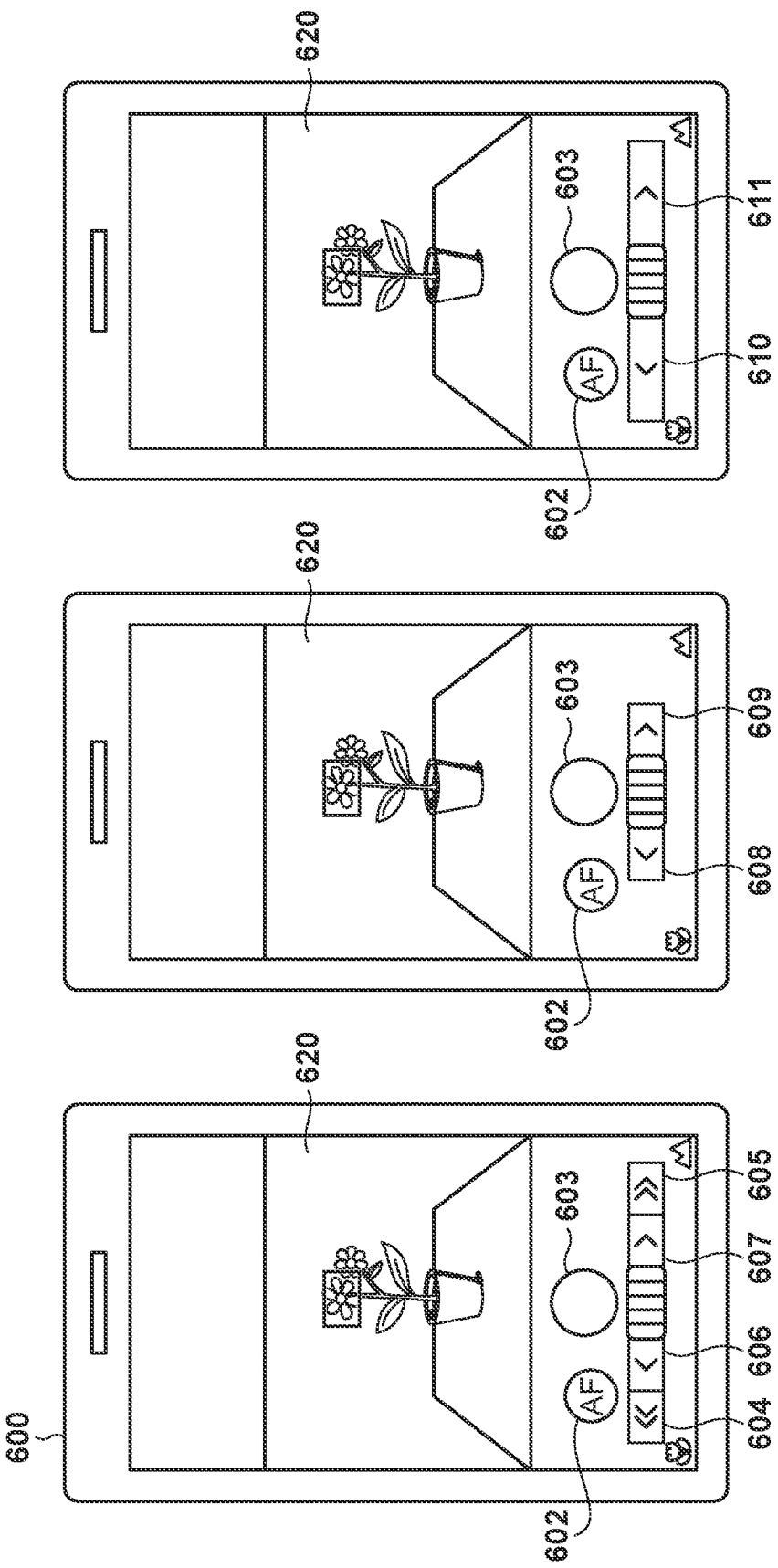

IMAGE CAPTURING APPARATUS CONTROLLING MANUAL FOCUS OPERATION AMOUNTS BEFORE AND AFTER AUTOFOCUS, CONTROL METHOD THEREOF, AND STORAGE MEDIUM

BACKGROUND OF THE INVENTION

Field of the Invention

The present invention relates to an image capturing control apparatus, a control method thereof, and a storage medium.

Description of the Related Art

Automatic focus adjustment ("AF" hereinafter) and manual focus adjustment ("MF" hereinafter) are known as focus adjustment methods for cameras. Cameras that are capable of more precise focus adjustment by combining the two and carrying out MF after focusing through AF are also known. Furthermore, some such cameras are capable of carrying out both rough focus adjustment, which makes rough adjustments to the focus, and fine focus adjustment, which makes fine adjustments to the focus, when adjusting the focus through MF. When using such a camera, if the rough focus adjustment is mistakenly executed during the MF following the AF, the focus position obtained from the AF will be greatly disturbed. It is then necessary to execute the AF again.

To address this problem, Japanese Patent Laid-Open No. 2015-118231 proposes a technique in which the state of focus after AF execution is detected, and the sensitivity of the focus adjustment ring used for MF is then changed in accordance with the detection result.

However, with the technique proposed by Japanese Patent Laid-Open No. 2015-118231, the sensitivity of the focus adjustment ring is determined in accordance with the state of focus immediately after the AF execution, and is then fixed to that sensitivity. In other words, the fixed sensitivity is not necessarily the finest sensitivity for making fine adjustments to the focus, and there are thus cases where the focus cannot be adjusted with the appropriate fine sensitivity when it is necessary to do so.

SUMMARY OF THE INVENTION

The present disclosure has been made in consideration of the aforementioned issues, and realizes a technique through which erroneous focus adjustment operations can be reduced in a situation where autofocus and manual focus are used together.

In order to solve the aforementioned problems, one aspect of the present disclosure provides an image capturing control apparatus comprising: an autofocus (AF) instruction switch configured to receive an instruction to carry out autofocus (AF); and at least one memory and at least one processor which function as: a display control unit configured to control a display of a first display item and a second display item that receive instructions to adjust a focus amount, as a manual focus (MF) operation; and a control unit configured to carry out control so that: in an MF operation carried out before AF, a focus position is moved by a first focus amount in response to the first display item being operated, and the focus position is moved by a second focus amount greater than the first focus amount in response to the second display item being operated; and in an MF operation carried out after the AF, the focus position is moved by the first focus amount in response to the first display item being operated, and the focus position is not moved in response to the second display item being operated, or the second display item is not displayed.

Another aspect of the present disclosure provides, an image capturing control apparatus comprising: an autofocus (AF) instruction switch configured to receive an instruction to carry out autofocus (AF); a first operation member and a second operation member configured to adjust a focus amount, as a manual focus (MF) operation; and at least one memory and at least one processor which function as: a control unit configured to carry out control so that: in an MF operation carried out before AF, a focus position is moved by a first focus amount in response to the first operation member being operated, and the focus position is moved by a second focus amount greater than the first focus amount in response to the second operation member being operated; and in an MF operation carried out after AF, the focus position is moved by the first focus amount in response to the first operation member being operated, and the focus position is not moved in response to the second operation member being operated.

Still another aspect of the present disclosure provides, an image capturing control apparatus comprising: an autofocus (AF) instruction switch configured to receive an instruction to carry out autofocus (AF); a first operation member configured to adjust a focus amount, as a manual focus (MF) operation; and at least one memory and at least one processor which function as: a control unit configured to carry out control so that: in an MF operation carried out before AF, a focus position is moved once in response to the start of an operation made using the first operation member, and the focus position movement is repeated continuously in response to the operation of the first operation member being continued for a prescribed amount of time; and in an MF operation carried out after the AF, the focus position is moved once in response to the start of an operation made using the first operation member, and the focus position is not moved in response to the operation of the first operation member being continued for the prescribed amount of time.

Yet another aspect of the present disclosure provides, an image capturing control apparatus comprising: an autofocus (AF) instruction switch configured to receive an instruction to carry out autofocus (AF); a first operation member configured to adjust a focus amount, as a manual focus (MF) operation; and at least one memory and at least one processor which function as: a control unit configured to carry out control so that: in an MF operation carried out before AF, a focus position is moved by a first focus amount in response to the first operation member being operated by a specific operation amount; and in an MF operation carried out after AF, the focus position is moved by a second focus amount less than the first focus amount in response to the first operation member being operated by the specific operation amount.

Still yet another aspect of the present disclosure provides, a method for controlling an image capturing control apparatus that comprises an auto focus (AF) instruction switch that receives an instruction to carry out autofocus (AF), the method comprising: controlling a display of a first display item and a second display item that receive an instruction to adjust a focus amount, as a manual focus (MF) operation; and carrying out control so that: in an MF operation carried out before AF, a focus position is moved by a first focus amount in response to the first display item being operated, and the focus position is moved by a second focus amount greater than the first focus amount in response to the second display item being operated; and in an MF operation carried out after the AF, the focus position is moved by the first focus amount in response to the first display item being operated, and the focus position is not moved in response to the second display item being operated, or the second display item is not displayed.

Yet still another aspect of the present disclosure provides, a method for controlling an image capturing control apparatus, the image capturing control apparatus comprising an auto focus (AF) instruction switch that receives an instruction to carry out autofocus (AF), and a first operation member and a second operation member that adjust a focus amount as a manual focus (MF) operation, the method comprising: carrying out control so that in an MF operation carried out before AF, a focus position is moved by a first focus amount in response to the first operation member being operated, and the focus position is moved by a second focus amount greater than the first focus amount in response to the second operation member being operated; and in an MF operation carried out after AF, the focus position is moved by the first focus amount in response to the first operation member being operated, and the focus position is not moved in response to the second operation member being operated.

Still yet another aspect of the present disclosure provides, a method for controlling an image capturing control apparatus, the image capturing control apparatus comprising an auto focus (AF) instruction switch that receives an instruction to carry out autofocus (AF), and a first operation member that adjusts a focus amount as a manual focus (MF) operation, the method comprising: carrying out control so that: in an MF operation carried out before AF, a focus position is moved once in response to the start of an operation made using the first operation member, and the focus position movement is repeated continuously in response to the operation of the first operation member being continued for a prescribed amount of time; and in an MF operation carried out after the AF, the focus position is moved once in response to the start of an operation made using the first operation member, and the focus position is not moved in response to the operation of the first operation member being continued for the prescribed amount of time.

Yet still another aspect of the present disclosure provides, a method for controlling an image capturing control apparatus, the image capturing control apparatus comprising an auto focus (AF) instruction switch that receives an instruction to carry out autofocus (AF), and a first operation member that adjusts a focus amount as a manual focus (MF) operation, the method comprising: carrying out control so that: in an MF operation carried out before AF, a focus position is moved by a first focus amount in response to the first operation member being operated by a specific operation amount; and in an MF operation carried out after AF, the focus position is moved by a second focus amount less than the first focus amount in response to the first operation member being operated by the specific operation amount.

Still yet another aspect of the present disclosure provides, a non-transitory computer-readable storage medium storing a program for causing a computer to execute a method for controlling an image capturing control apparatus, the apparatus comprising an auto focus (AF) instruction switch that receives an instruction to carry out autofocus (AF), the method comprising: controlling a display of a first display item and a second display item that receive an instruction to adjust a focus amount, as a manual focus (MF) operation; and carrying out control so that: in an MF operation carried out before AF, a focus position is moved by a first focus amount in response to the first display item being operated, and the focus position is moved by a second focus amount greater than the first focus amount in response to the second display item being operated; and in an MF operation carried out after the AF, the focus position is moved by the first focus amount in response to the first display item being operated, and the focus position is not moved in response to the second display item being operated, or the second display item is not displayed.

According to the present invention, erroneous focus adjustment operations can be reduced in a situation where autofocus and manual focus are used together.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIGS. 3A-1, 3A-2, 3B-1, 3B-2 and 3B-3 are flowcharts illustrating a sequence of operations in focus adjustment according to the first embodiment.

FIGS. 5A-1, 5A-2 and 5B are flowcharts illustrating a sequence of operations carried out when adjusting the focus of a digital camera from a smartphone, according to a second embodiment.

FIGS. 6A to 6C are diagrams illustrating an example of the configuration of a screen displayed in the smartphone according to the second embodiment.

DESCRIPTION OF THE EMBODIMENTS

First Embodiment

Exemplary embodiments of the present invention will be described hereinafter in detail with reference to the drawings. The following describes an example of using a digital camera 100, which is capable of receiving instructions to carry out autofocus and instructions to adjust the focus amount through a manual focus (MF) operation, as an example of an image capturing control apparatus.

Figure 1:
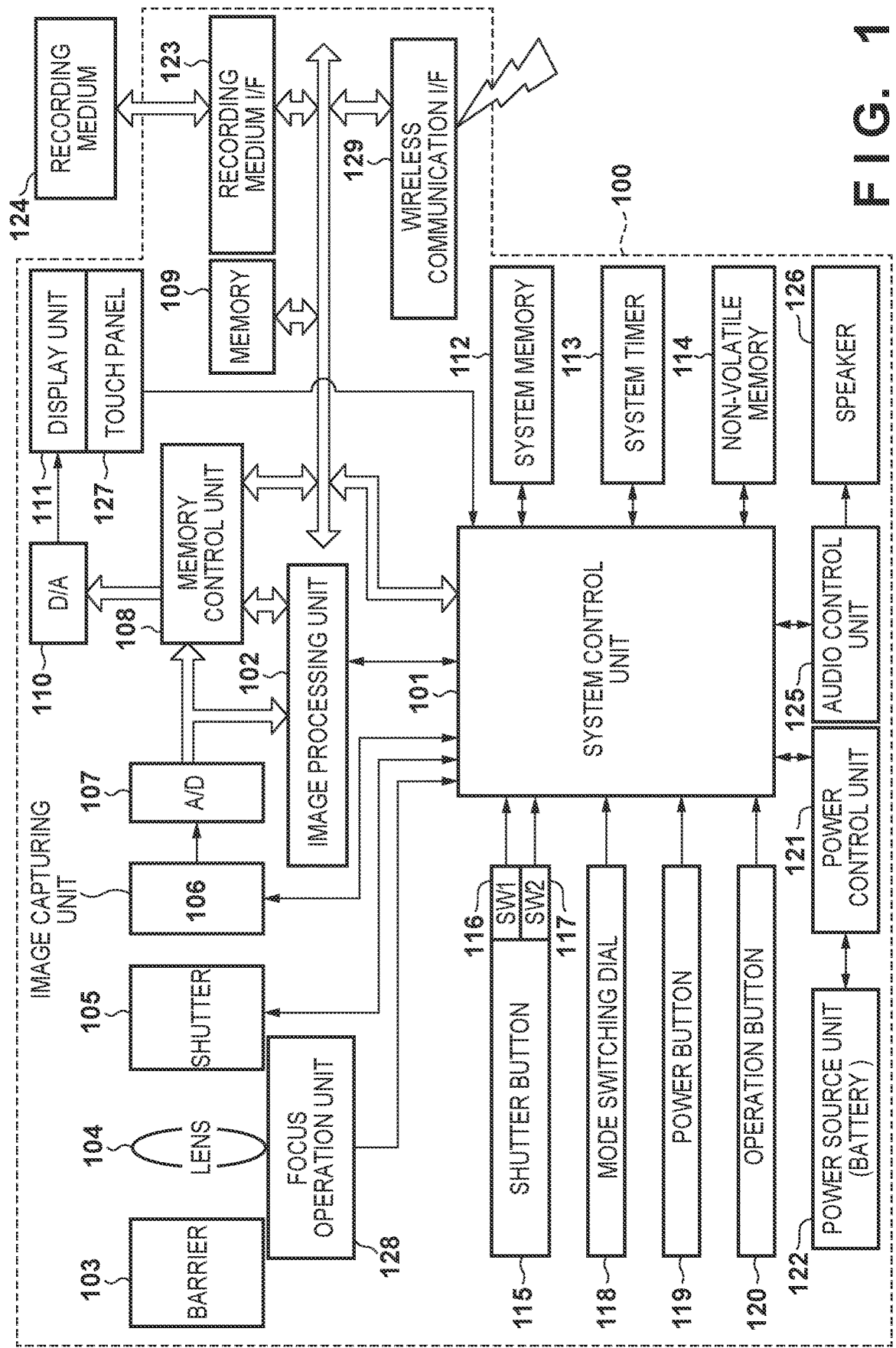
FIG. 1 is a block diagram illustrating an example of the functional configuration of a digital camera serving as an example of an image capturing control apparatus according to a first embodiment.

FIG. 1 illustrates an example of the functional configuration of the digital camera 100 according to the present embodiment.

A shooting lens 104 corresponds to a lens group including a zoom lens and a focus lens. A shutter 105 is a shutter having an aperture function. An image capturing unit 106 is an image sensor constituted by a CCD, a CMOS element, or the like that converts an optical image into an electrical signal. An A/D converter 107 includes a circuit that converts analog signals into digital signals, and converts an analog image signal output from the image capturing unit 106 into a digital signal and outputs the digital signal.

A barrier 103 prevents an imaging system including the shooting lens 104, the shutter 105, and the image capturing unit 106 from being soiled or damaged by covering the shooting lens 104. Although the present embodiment describes an example in which the shooting lens 104 is fixed to the main body of the digital camera 100, the shooting lens 104 may be an interchangeable lens.

An image processing unit 102 carries out prescribed pixel interpolation, resizing processing such as reduction, color conversion processing, and the like on data from the A/D converter 107 or data from a memory control unit 108. The image processing unit 102 also performs predefined computational processing using captured image data, and a system control unit 101 performs exposure control and focus control based on results obtained from these computations. A TTL (through-the-lens) AF (autofocus) process, an AE (automatic exposure) process, and an EF (flash pre-emission) process are realized as a result. The image processing unit 102 also performs predefined computations using the captured image data, performing a TTL AWB (auto white balance) process on the basis of the results thereof.

Data output from the A/D converter 107 is written directly into memory 109 through the image processing unit 102 and the memory control unit 108, or through the memory control unit 108. The memory 109 stores the image data obtained by the image capturing unit 106 and converted into digital data by the A/D converter 107, image data for display in a display unit 111, and the like. The memory 109 has a storage capacity sufficient to store a predefined number of still images, a predefined time's worth of moving images and audio, and so on.

The memory 109 also functions as image display memory (video memory). A D/A converter 110 converts data for image display, stored in the memory 109, into an analog signal and supplies the analog signal to the display unit 111. Image data for display written into the memory 109 thus displayed by the display unit 111 via the D/A converter 110 in this manner.

The display unit 111 carries out a display in the display device, which is an LCD or the like, based on the analog signal from the D/A converter 110. The digital signals A/D converted by the A/D converter 107 and stored in the memory 109 are converted into analog signals by the D/A converter 110, and those signals are then sequentially transferred and displayed in the display unit 111. This makes it possible to realize an electronic viewfinder function, where a through-the-lens image is displayed (this will be called a "live view image" hereinafter).

Non-volatile memory 114 is memory that can be recorded to and erased electrically, and is constituted by, for example, EEPROM or the like. Operational constants, programs, and so on of the system control unit 101 are stored in the non-volatile memory 114. Here, "programs" refers to programs for executing the various flowcharts according to the present embodiment, which will be described later.

The system control unit 101 controls the entire digital camera 100. The respective processes according to the present embodiment, mentioned later, are realized by loading programs, which are recorded in the non-volatile memory 114 mentioned above, into system memory 112 and executing those programs. The system control unit 101 also carries out display control by controlling the memory 109, the D/A converter 110, the display unit 111, and so on. The system memory 112 includes volatile memory such as DRAM, and temporarily stores operational constants and variables for the system control unit 101, programs read out from the non-volatile memory 114, and so on. A system timer 113 is a time measurement unit that measures times used in various types of control, measures the time of an internal clock, and so on.

A shutter button 115, a mode switching dial 118, a power button 119, and an operation unit 120 are operation members for inputting various types of operating instructions to the system control unit 101. The operation unit 120 is an operation member separate from 115 to 119, and includes dials, buttons, and the like, which will be described later with reference to FIGS. 2A and 2B. The mode switching dial 118 switches the operating mode of the system control unit 101 between a still image recording mode, a moving image recording mode, a playback mode, and detailed modes included in each of the stated operating modes.

A first shutter switch 116 switches on partway through the operation of the shutter button 115 provided in the digital camera 100, or in other words, when the button is depressed halfway (a shooting preparation instruction), and produces a first shutter switch signal SW1. The system control unit 101 starts operations such as AF (autofocus) processes, AE (automatic exposure) processes, AWB (auto white balance) processes, and EF (flash pre-emission) processes in response to the first shutter switch signal SW1. In other words, the first shutter switch 116 functions as an AF instruction switch that receives an instruction to carry out autofocus (AF).

A second shutter switch 117 turns on when the shutter button 115 is completely operated, or in other words, is fully depressed (a shooting instruction), and produces a second shutter switch signal SW2. The system control unit 101 commences a series of shooting processes, from reading out signals from the image capturing unit 106 to writing image data into a recording medium 124, in response to the second shutter switch signal SW2.

A power control unit 121 is constituted by a battery detection circuit, a DC-DC converter, switch circuits for switching the blocks through which power passes, and so on, and detects the state of the power button 119, whether or not a battery is connected, the type of the battery, the remaining battery power, and so on. The power control unit 121 also controls the DC-DC converter based on the detection results and instructions from the system control unit 101, and supplies a necessary voltage for a necessary period to the various units, including the recording medium 124.

A power source unit 122 is a primary battery such as an alkali battery, a lithium battery, or the like, a secondary battery such as a NiCd battery, a NiMH battery, a Li battery, or the like, an AC adapter, and so on. The present embodiment will describe an example in which a secondary battery is used as the power source unit (called a "battery" hereinafter).

A recording medium I/F 123 is an interface for the recording medium 124, which is a memory card, a hard disk, or the like. The recording medium 124 is a recording medium for recording shot images, such as a memory card or the like, and is constituted by semiconductor memory, a magnetic disk, or the like.

An audio control unit 125 includes an audio processing circuit that generates audio to be emitted from a speaker 126, and makes it possible for notifications such as warnings to be made through the speaker 126 as audio.

A wireless communication I/F 129 can communicate wirelessly with an external device. This makes it possible to send data to other cameras, mobile terminals, PCs, and the like, as well as receive instructions for shooting by the image capturing unit 106, controlling AF and MF operations, and the like from a mobile terminal.

Figure 2A:
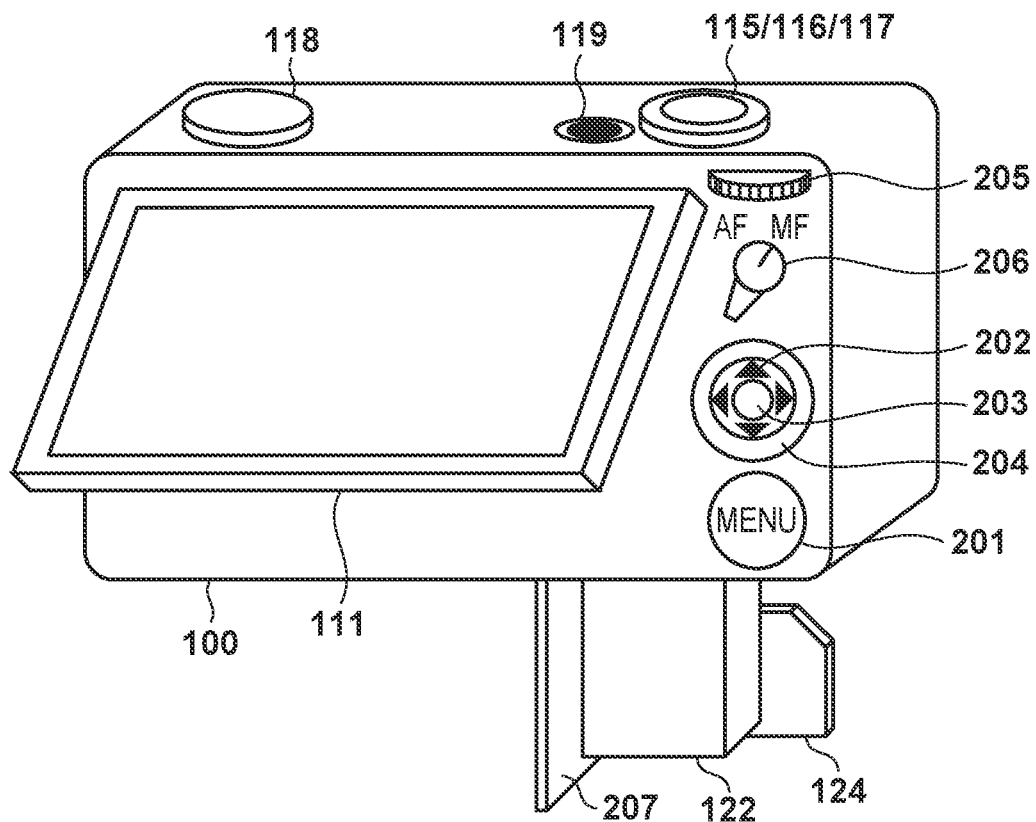
FIGS. 2A and 2B are diagrams illustrating an example of the external configuration of the digital camera according to the first embodiment.
Figure 2B:
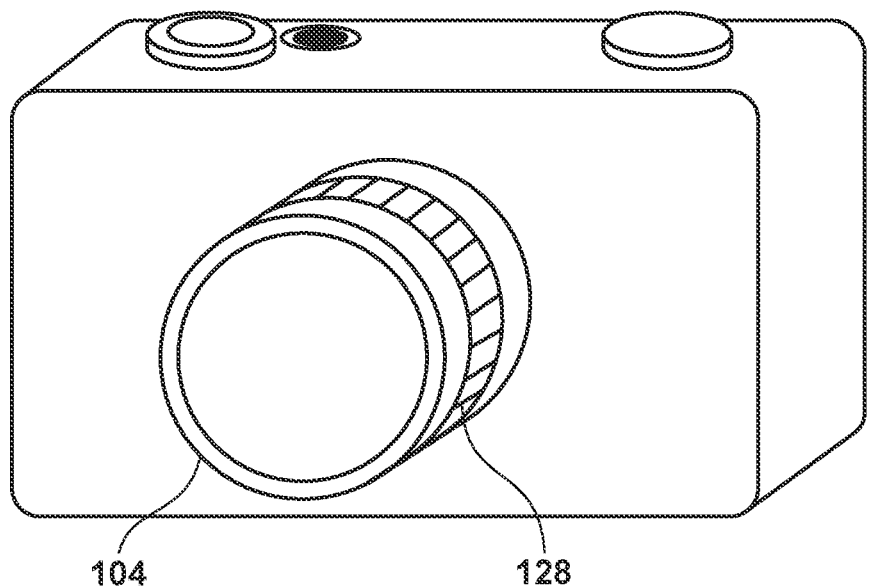
Figures 1, 3A:
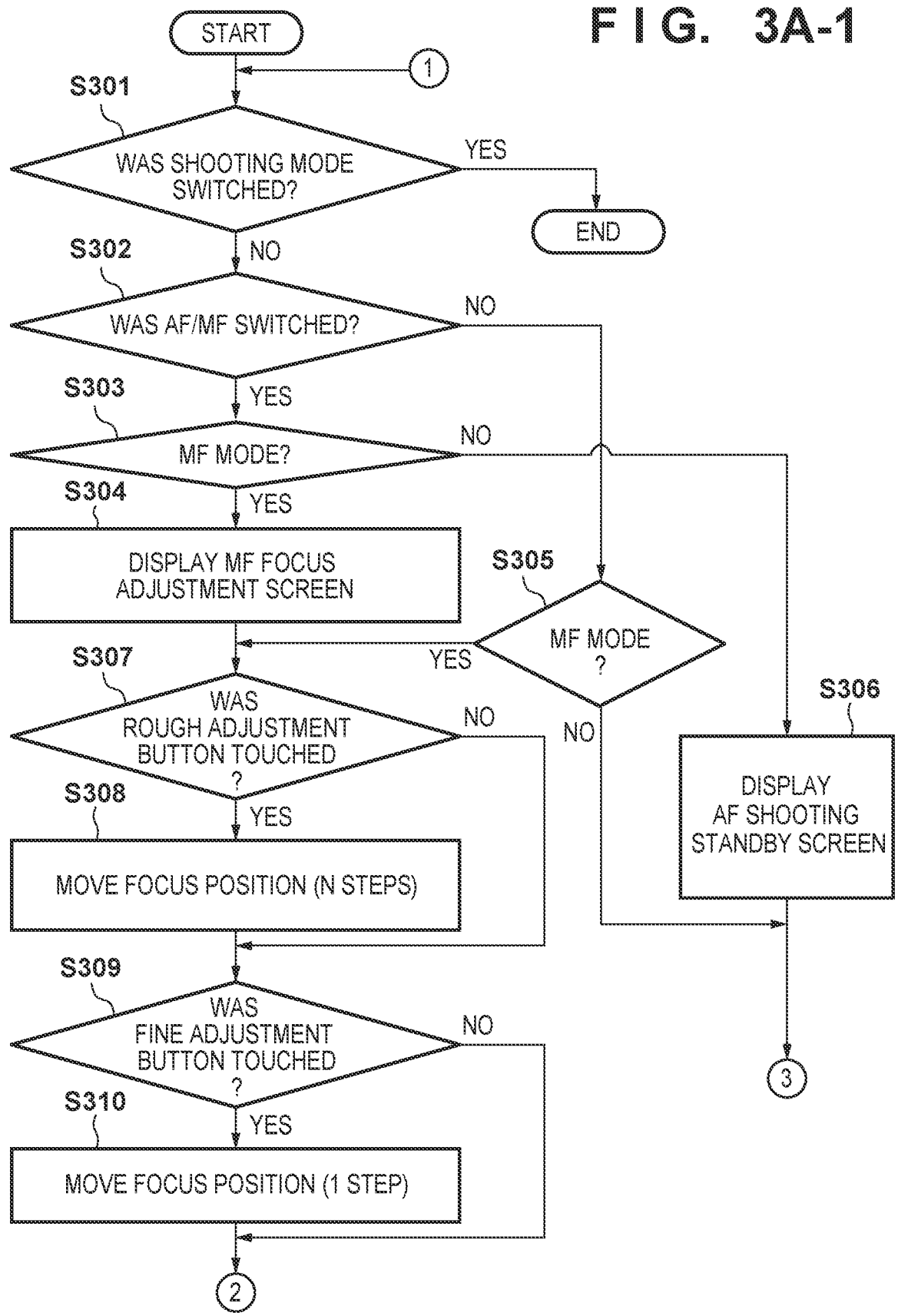
Figures 2, 3A:
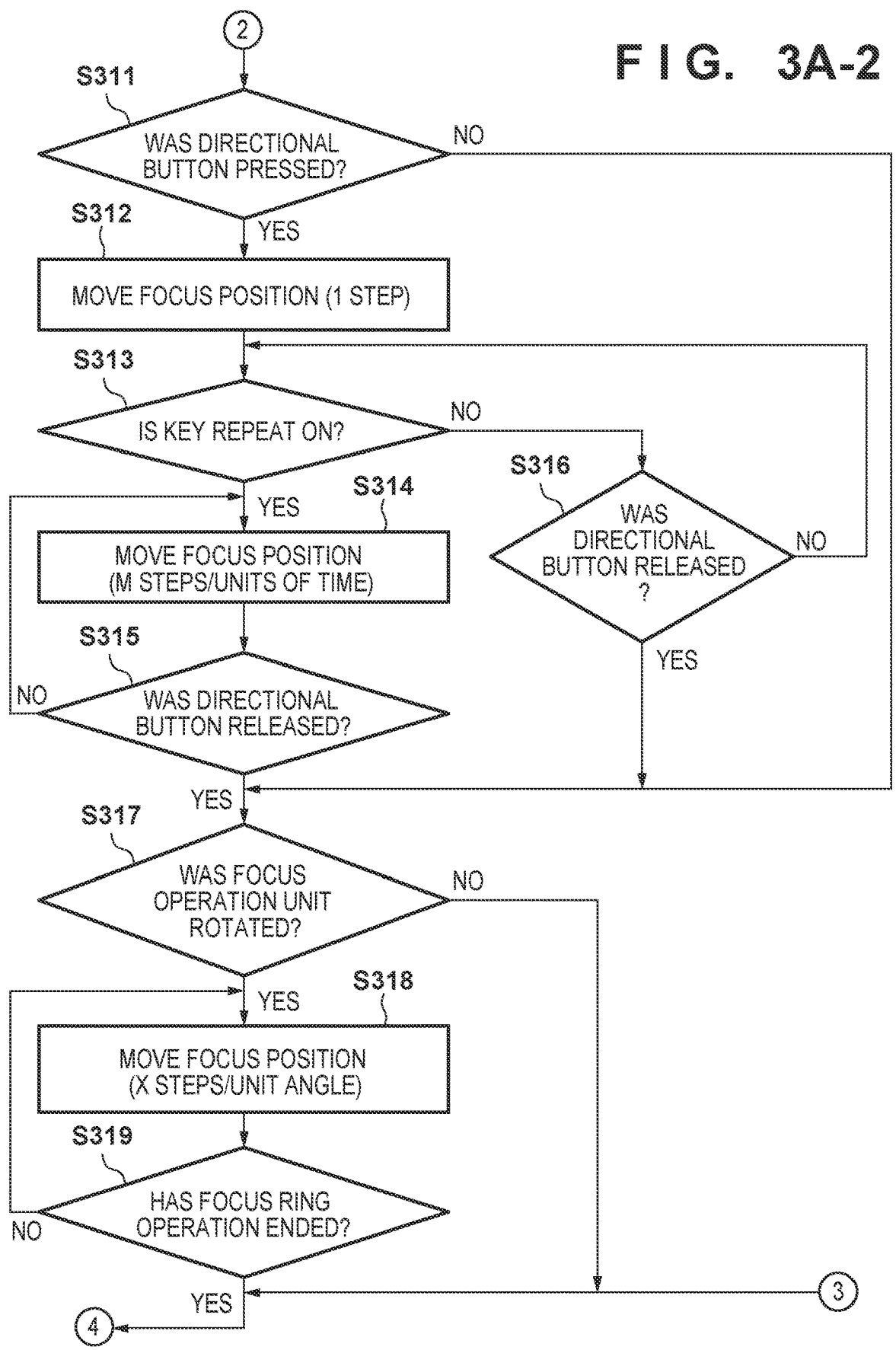
Figures 1, 3B:
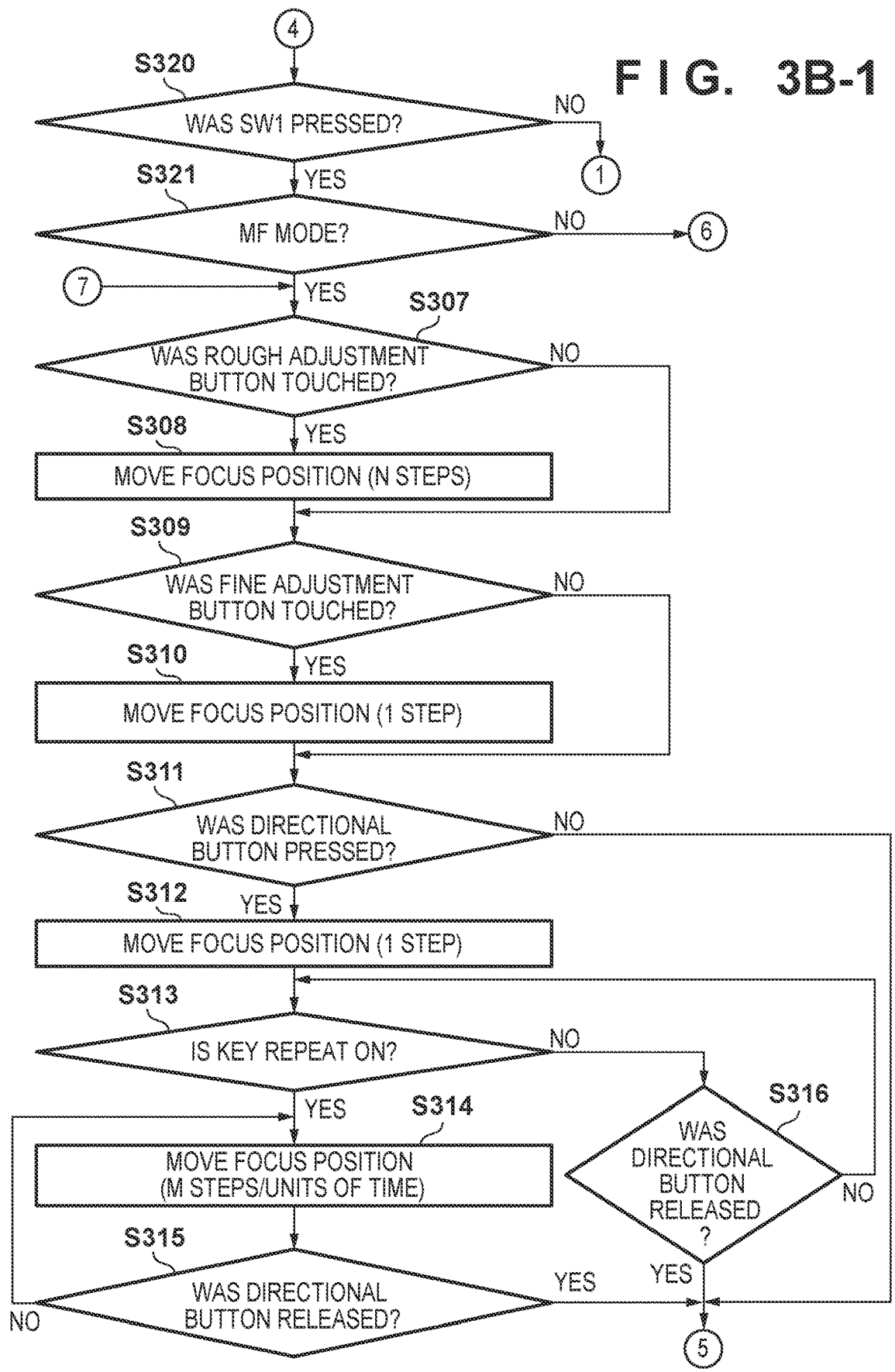
Figures 2, 3B:
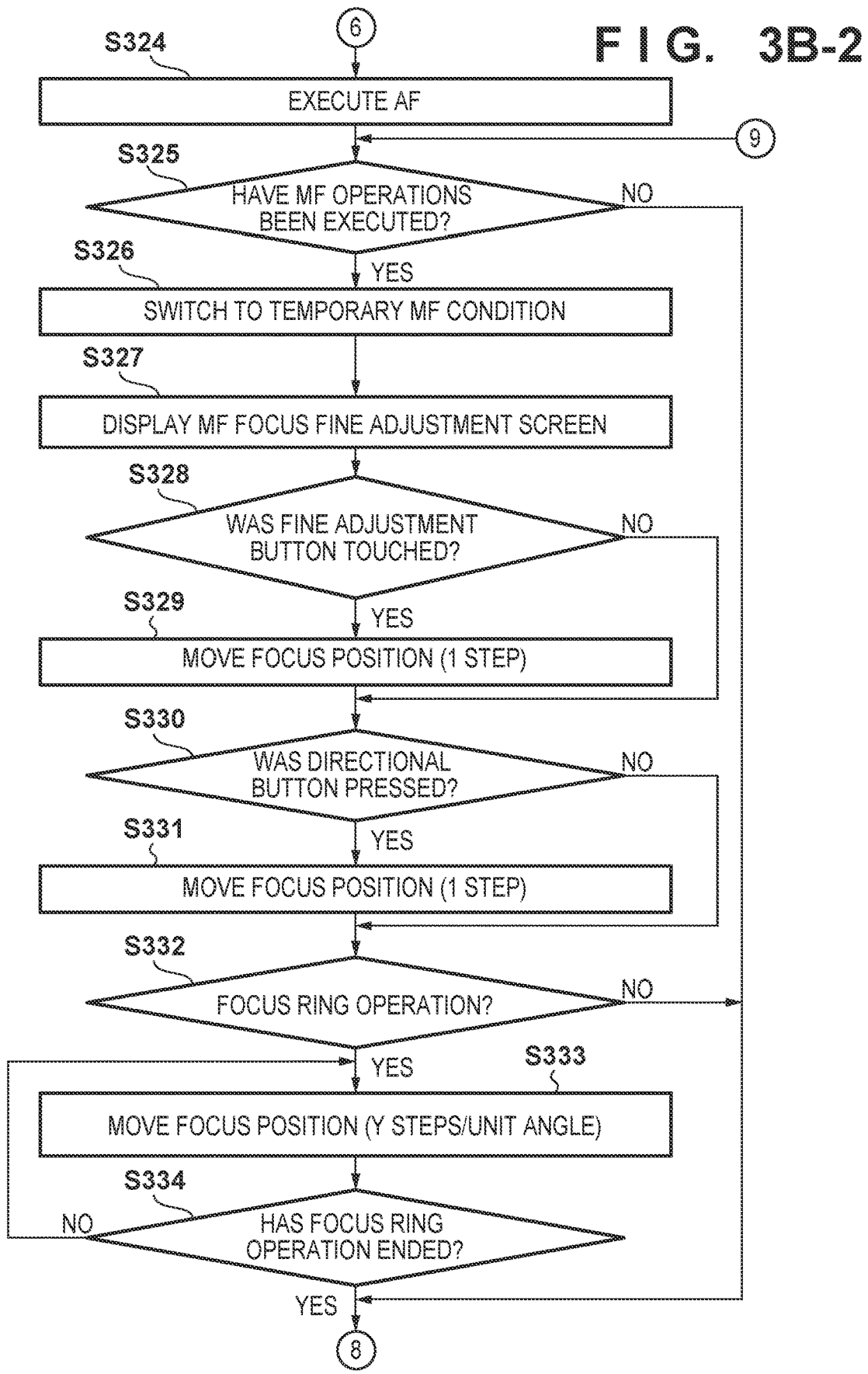

The external configuration of the digital camera 100 according to the present embodiment will be described with reference to FIGS. 2A and 2B.

Functions relevant for different situations are assigned to operation members in the operation unit 120, which then act as various types of function buttons, by making an operation for selecting various types of function icons displayed in the display unit 111. An end button, a return button, a next image button, a jump button, a sort button, an attribute change button, and so on are examples of the function buttons. For example, the system control unit 101 displays a menu screen, in which various types of settings can be made, in the display unit 111 when a menu button 201 illustrated in FIG. 2A is pressed. A user can make various types of settings intuitively using the menu screen displayed in the display unit 111, along with a directional button 202 including up, down, left, and right directional buttons, a set button 203, and so on.

A controller wheel 204 and the electronic dial 205 are operation members, included in the operation unit 120, that can be rotationally manipulated. These are used when a rotational operation to adjust the focus amount is used as an MF operation, when instructing items to be selected in the menu screen displayed in the display unit 111 while also using the directional buttons, and so on. When the controller wheel 204 or the electronic dial 205 is rotationally manipulated, an electrical pulse signal is produced in accordance with the operation amount, and the system control unit 101 controls the respective units in the digital camera 100 based on that pulse signal. An angle to which the controller wheel 204 or the electronic dial 205 has been rotationally manipulated, a number of revolutions, and so on can be determined based on this pulse signal. Note that the controller wheel 204 and the electronic dial 205 may be any kind of operation member as long as the member is capable of detecting rotational manipulation. For example, the controller wheel 204 and the electronic dial 205 may a dial-type operation members that produce pulse signals upon the controller wheel 204 or the electronic dial 205 itself rotating in accordance with a rotational operation made by a user. Alternatively, the controller wheel 204 may be an operation member constituted by a touch sensor, with the controller wheel 204 detecting rotational movement of a user's finger on the controller wheel 204 rather than the controller wheel 204 itself rotating (a so-called "touch wheel").

A focus operation unit 128 is a rotational member provided on the outer circumference of the camera lens. Like the controller wheel 204 and the electronic dial 205, the focus operation unit 128 produces an electrical pulse signal in accordance with a rotational operation amount, and the focus lens is moved in accordance with the number of pulse signals. The focus operation unit 128 is active during MF operations, where the focus is adjusted manually. The movement speed of the focus lens can be changed by using a program to control the number of times the electrical pulse signal is detected per unit angle of rotation of the focus operation unit 128. Detecting a greater number of pulse signals when the focus operation unit 128 is rotated by the unit angle of rotation increases the movement speed of the focus lens. As such, the focus amount (focus position) can be changed greatly by rotating the focus operation unit 128 only a small amount (rough focus position adjustment). Conversely, detecting a smaller number of pulse signals when the focus operation unit 128 is rotated by the unit angle of rotation reduces the movement speed of the focus lens, and makes it possible to change the focus position only a small amount by rotating the focus operation unit 128 (fine focus position adjustment). The focus position adjustment can also be carried out using the controller wheel 204 or the electronic dial 205.

An AF mode switching lever 206 is a lever for switching between AF and MF, which are methods for adjusting the focus of the lens, and functions as a mode switching member.

The battery 122 and the recording medium 124 can be inserted into the digital camera 100 from the bottom face thereof, and can be covered by a cover 207 that can be opened and closed.

A touch panel 127 capable of detecting contact with the display unit 111 is included as part of the operation unit 120. The touch panel 127 and the display unit 111 can be configured as an integrated unit. For example, the touch panel 127 is configured having a light transmittance that does not interfere with the display of the display unit 111, and is attached to the upper layer of the display surface of the display unit 111. An input coordinate system of the touch panel 127 is then associated with a display coordinate system of the display unit 111. This makes it possible to configure a GUI that makes the user feel as if he or she can directly manipulate the screen displayed in the display unit 111.

The system control unit 101 can detect the following operations with respect to the touch panel:
  when the touch panel has been touched by a finger or a stylus (called "touch-down" hereinafter);
  when the touch panel is being touched by a finger or a stylus (called "touch-on" hereinafter);
  when a finger or stylus is moved while touching the touch panel (called "moving" hereinafter);
  when a finger or stylus that had been touching the touch panel is removed (called "touch-up" hereinafter); and
  when the touch panel is not being touched by anything (called "touch-off" hereinafter).

These operations, as well as the positional coordinates on the touch panel where the finger or stylus is touching, are communicated to the system control unit 101 through an internal bus, and the system control unit 101 then determines what type of operation has been made on the touch panel on the basis of the communicated information. With respect to "moving", the movement direction of the finger or stylus moving on the touch panel can also be determined on the basis of changes in the positional coordinates, for each of a vertical component and a horizontal component on the touch panel. When a touch-down, a constant move, and a touch-up are made in that sequence on the touch panel, it is assumed that a stroke has been drawn. An operation of quickly drawing a stroke is called "flicking". "Flicking" is an operation of quickly moving a finger on the touch panel for only a certain distance and then removing the finger, or in other words, an operation of quickly tracing a finger on the touch panel so as to "flick" the touch panel. A "flick" can be determined to have been carried out if a "move" of greater than or equal to a prescribed distance and at greater than or equal to a prescribed speed is detected and a touch-up is then detected. A dragging operation is determined to have been carried out if a "move" of greater than or equal to a prescribed distance but less than a prescribed speed has been detected. An operation of entering a specific region while "moving" along the touch panel with a finger or a stylus (called "move-in" hereinafter) and an operation of exiting the specific region while "moving" (called "move-out"

hereinafter) can also be detected. Any of a variety of types of touch panels, such as resistive film, electrostatic capacitance, surface elastic wave, infrared, electromagnetic induction, image recognition, and photodetector, may be used as the touch panel.

Sequence of Operations for Adjusting Focus

A sequence of operations for adjusting the focus will be described next with reference to FIGS. 3A-1, 3A-2, and 3B-1 to 3B-3. The processes in this sequence of operations are realized by the system control unit 101 loading programs, which are stored in the non-volatile memory 114, into the system memory 112 and executing those programs. The sequence of operations is started in response to, for example, the user operating the operation unit 120 to switch the operating mode of the digital camera 100 to a shooting standby process.

In step S301, when the shooting standby process is started, the system control unit 101 periodically determines whether the shooting mode has been switched. The system control unit 101 ends the sequence of processes if it is determined that the shooting mode has been switched, and moves the process to step S302 when such is not the case.

In step S302, the system control unit 101 periodically monitors the operation of the AF mode switching lever 206, and determines whether or not the AF mode has been switched. The system control unit 101 moves the process to step S303 if it has been determined, on the basis of a notification from the AF mode switching lever 206, that the AF mode has been switched, and moves the process to step S305 when such is not the case.

In step S303, the system control unit 101 determines the focus mode in effect after the switch. The process moves to step S304 if it is determined that the focus mode currently set as the MF mode, and moves to step S306 when such is not the case.

Figure 4A:
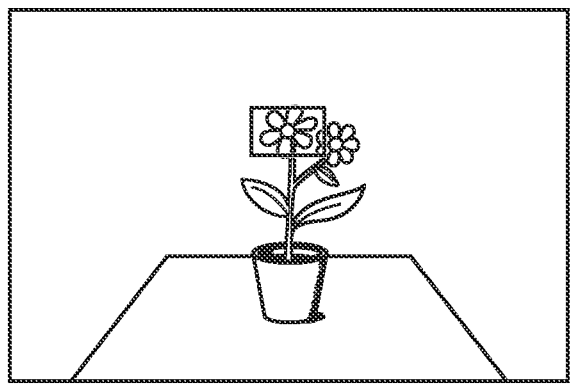
FIGS. 4A to 4D are diagrams illustrating an example of a screen display involved in focus adjustment operations according to the first embodiment.
Figure 4B:
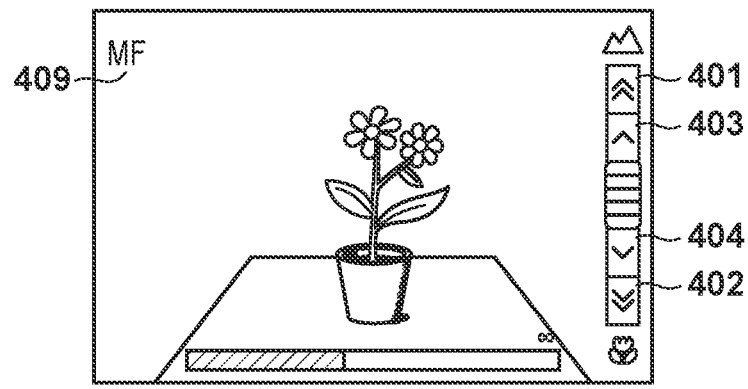

In step S304, the system control unit 101 displays, in the display unit 111, an MF focus adjustment screen for receiving a focus amount adjustment instruction as an MF operation from the user. In the MF focus adjustment screen, display items (a GUI), for receiving the focus amount adjustment instruction as an MF operation, are superimposed over an image including the subject image, as illustrated in FIG. 4B, for example. The system control unit 101 displays an "MF" icon 409, indicating that the focus can be adjusted manually, in the MF focus adjustment screen. The display items displayed in the MF focus adjustment screen will be described in detail later.

On the other hand, in step S306, the system control unit 101 displays, in the display unit 111, an AF shooting standby screen, because it was determined (in step S303) that the focus mode after the switch is the AF mode. The AF shooting standby screen is a screen such as that illustrated in FIG. 4A.

In step S305, the system control unit 101 determines whether the current focus mode is the MF mode. In other words, the system control unit 101 determines the current focus mode because it was determined (in step S302) that the mode has not been switched to the AF mode. If it has been determined that the current focus mode is the MF mode, the system control unit 101 moves the process to step S307 in order to carry out MF mode processing. However, if it has been determined that the current focus mode is the AF mode, the system control unit 101 does not carry out processing specific to the MF mode. Instead, the system control unit 101 moves the process to step S320 to detect the first shutter switch 116 for the purpose of shooting preparations.

The processing in the MF mode (steps S307 to S319) will be described next. In step S307, the system control unit 101 determines whether or not a rough adjustment touch button 401 or 402, which are displayed in an MF mode focus adjustment screen, have been touched. The rough adjustment touch buttons 401 and 402 are buttons for moving the focus position at a large focus amount in response to even a small touch by the user. If the system control unit 101 has determined that a touch on the rough adjustment touch button 401 or 402 has been detected, the process moves to step S308. When such is not the case, the process moves to step S309.

In step S308, the system control unit 101 moves the focus position by N steps (i.e., moves the focus position by one step a total of N times).

In step S309, the system control unit 101 determines whether a fine adjustment touch button 403 or 404 has been touched. The fine adjustment touch buttons 403 and 404 are buttons for moving the focus position only a small amount upon being pressed by the user. If the system control unit 101 has determined that the fine adjustment touch button 403 or 404 has been pressed, the process moves to step S310. When such is not the case, the process moves to step S311.

In step S310, the system control unit 101 moves the focus position by one step, which is, for example, the minimum unit of movement. Here, the system control unit 101 moves the focus position toward infinity when the rough adjustment touch button 401 and the fine adjustment touch button 403 are pressed, and moves the focus position toward the near end when the rough adjustment touch button 402 and the fine adjustment touch button 404 are pressed. The step number N for rough adjustment can be used for the rough adjustment of the focus position as long as it is an amount sufficiently greater than the prescribed number of steps for fine adjustment (1, in this example).

In step S311, the system control unit 101 determines whether or not the directional button 202 has then been pressed, as a process in the MF mode. If the system control unit 101 has determined that the directional button 202 has been pressed, the process moves to step S312. When such is not the case, the process moves to step S317.

In step S312, the system control unit 101 moves the focus position by one step in response to the start of the operation of the directional button 202. Then, in step S313, the system control unit 101 determines whether or not a key repeat has occurred. The system control unit 101 is configured to produce a key repeat when the directional button remains pressed for a prescribed amount of time without being released. If it is determined that a key repeat has not occurred, in step S316, the system control unit 101 further determines whether the directional button has been released. If it is determined that the directional button remains pressed, the system control unit 101 returns the process to step S316 and stands by for the determination of a key repeat. However, if it is determined that the directional button has been released, the process moves to step S315, where the focus position movement in response to the directional button being pressed ends.

On the other hand, if in step S313 it is determined that a key repeat has occurred, the system control unit 101 moves the process to step S314. In step S314, the system control unit 101 moves the focus position. The system control unit 101 continuously moves the focus position until it is determined, in step S315, that the directional button has been released. In other words, the system control unit 101 moves the focus position M steps per unit of time during a key repeat. Note that rough adjustments can be made to the focus position by holding the directional button 202 down as long as the step number M is a value sufficiently greater than the step number of 1 for the fine focus position adjustment. In the present embodiment, the system control unit 101 moves the focus position toward infinity when the "up" part of the directional button 202 is pressed, and moves the focus position toward the near end when the "down" part of the directional button 202 is pressed.

In step S317, the system control unit 101 determines whether or not the focus operation unit 128 has been rotated, as the final part of the MF mode processing. If it is determined that the focus operation unit 128 has been rotated, the system control unit 101 moves the process to step S318, whereas the process moves to step S320 when such is not the case. In step S318, the system control unit 101 moves the focus position. In step S319, the system control unit 101 determines whether the operation of rotating the focus operation unit 128 has ended, and moves the process to step S320 if it is determined that the operation has ended. The process returns to step S318 when such is not the case. In other words, the system control unit 101 moves the focus position until the rotation of the focus operation unit 128 is stopped. In the present embodiment, the system control unit 101 moves the focus position by X steps per unit angle of rotation.

Next, in step S320, the system control unit 101 determines whether the first shutter switch 116, for carrying out shooting preparations, has been pressed. If it is determined that the first shutter switch 116 has not been pressed, the system control unit 101 returns the process to step S301 in order to repeat the processing carried out in the shooting standby state. On the other hand, if it is determined that the first shutter switch 116 has been pressed, the system control unit 101 moves the process to step S321 and starts the processing for shooting preparations.

In step S321, the system control unit 101 determines the current focus mode. The system control unit 101 moves the process to step S307 if it is determined that the focus mode is the MF mode, and to step S324 when such is not the case (i.e., if the focus mode is the AF mode).

Thereafter, the system control unit 101 carries out a sequence of processes for MF focus adjustment. However, these processes are the same as the above-described processes carried out during shooting standby in the MF mode (steps S307 to S319), and will therefore not be described here.

In step S322, the system control unit 101 determines whether the first shutter switch 116 has been released. If it is determined that the switch has been released, the process moves to step S301 to return to the processing at the beginning of the shooting standby state. When such is not the case, the process moves to step S323. In step S323, the system control unit 101 determines whether the second shutter switch 117, for instructing the shooting process to start, has been pressed. If it is determined that the second shutter switch 117 has been pressed, the system control unit 101 moves the process to step S341 and executes the shooting process. When such is not the case (i.e., when it is determined that the second shutter switch 117 has not been pressed), the process returns to step S307, which is a state in which the first shutter switch 116 is pressed.

On the other hand, if in the above-described step S321 it has been determined that the focus mode is the AF mode, in step S324, the system control unit 101 executes AF. The user can manually adjust the focus through MF operations after AF has been executed. Here, in step S325, the system control unit 101 determines whether MF operations have been executed. In other words, the system control unit 101 determines whether an operation of a touch button in the focus adjustment screen, the directional button 202, or the focus operation unit 128 has been detected. If it is determined that an MF operation has been executed on the basis of a notification from these operation members, the system control unit 101 moves the process to step S326.

Figure 4C:
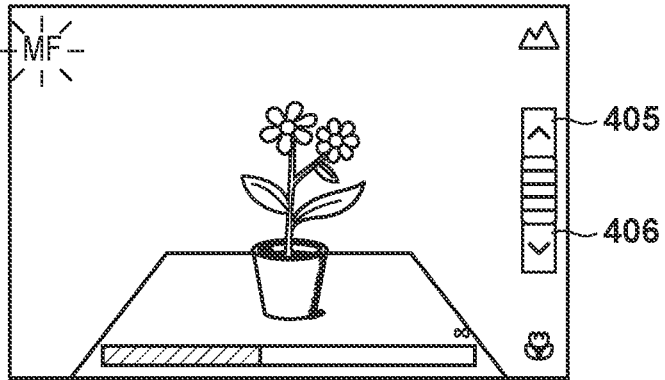

In step S326, the system control unit 101 switches to MF (so-called "AF+MF") as a temporary internal process, and in step S327, displays an MF focus fine adjustment screen. FIG. 4C illustrates an example of the MF focus fine adjustment screen. In the example in FIG. 4C, the system control unit 101 hides the rough adjustment touch buttons 401 and 402 for making rough adjustments to the focus position during MF operations after executing AF, in order to restrict the rough adjustment of the focus position. The system control unit 101 may change the rough adjustment touch buttons 401 and 402 to fine adjustment touch buttons, as illustrated in FIG. 4D, as a different example of a display for restricting the rough adjustment.

Figure 4D:
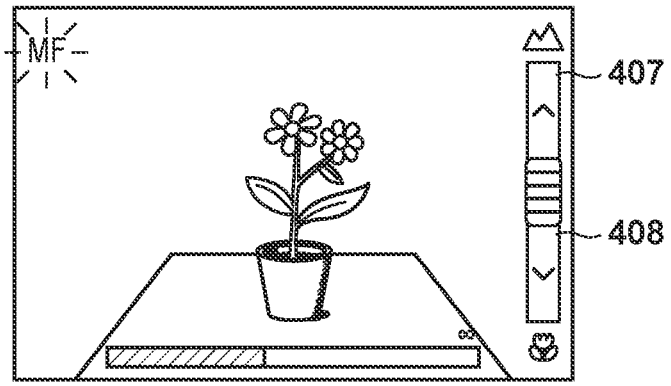
Figures 2, 5A:
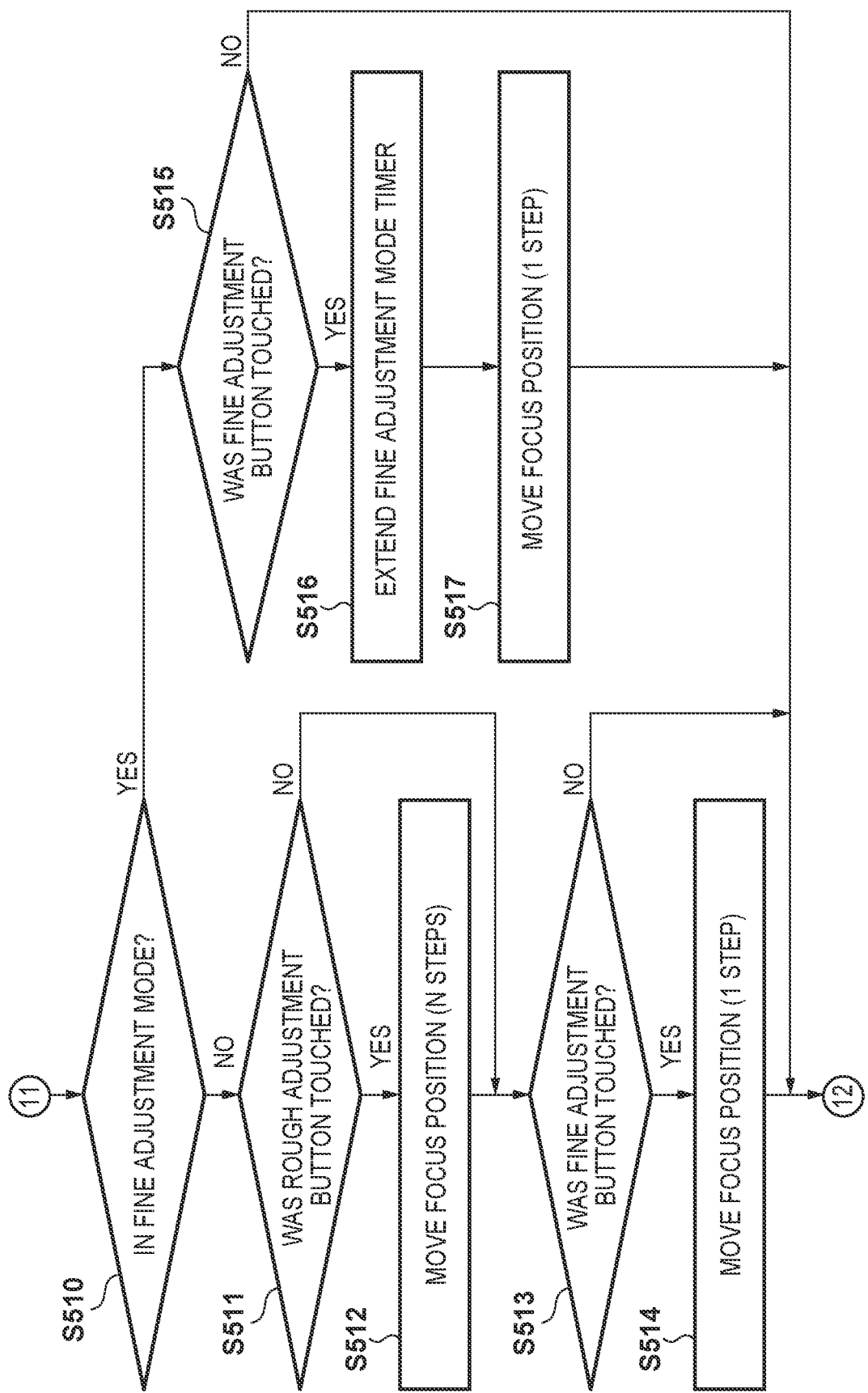
Figure 5B:
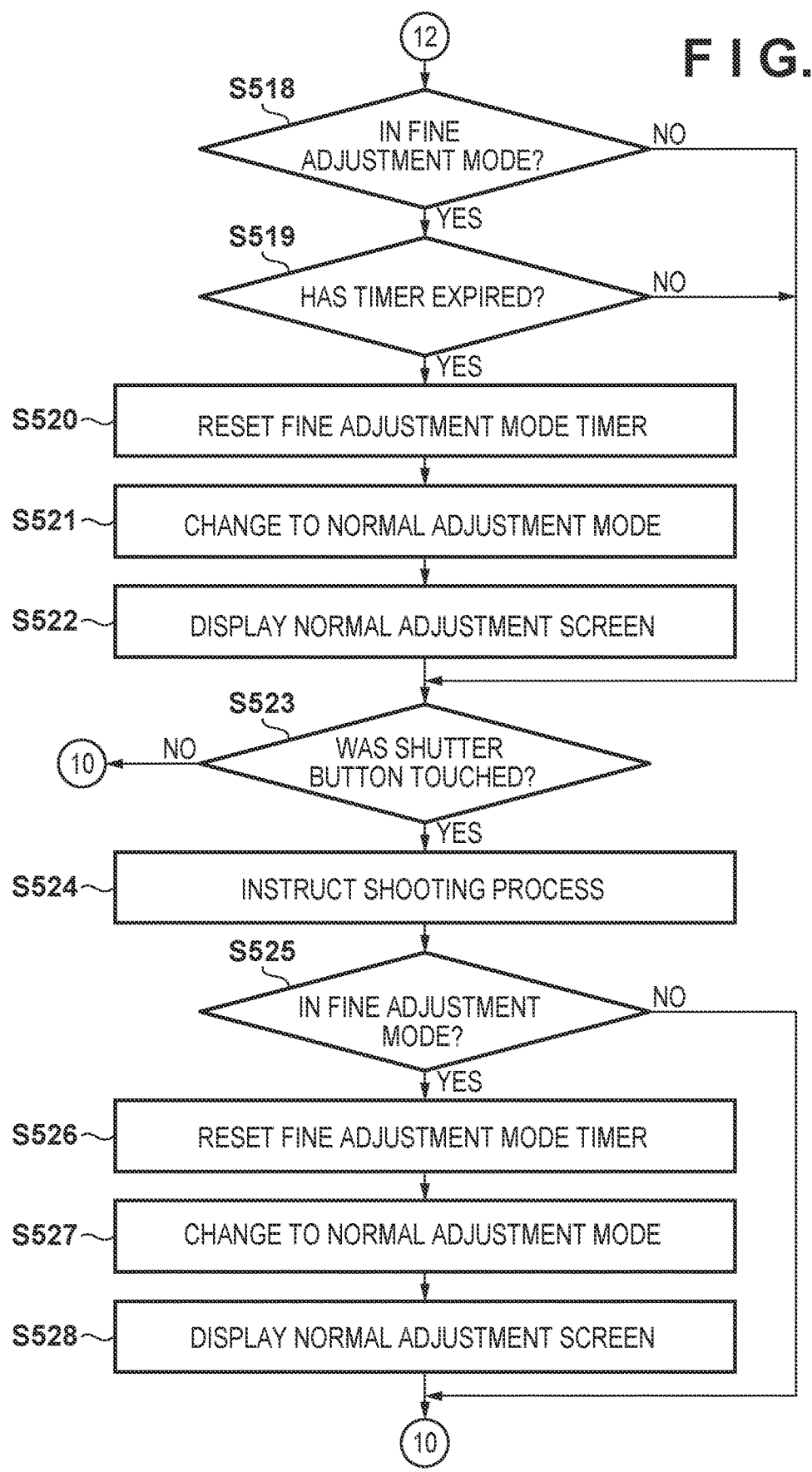

In the focus adjustment screens illustrated in FIGS. 4C and 4D, the system control unit 101 displays the "MF" icon in a flashing state to indicate that despite the AF mode being active, the focus can temporarily be adjusted manually, which is different from the normal MF mode. This display also serves to notify the user that the mode has temporarily switched to a dedicated mode for fine focus position adjustment and that the focus position will not move even if the rough adjustment touch buttons 401 and 402 are operated. Note that the user notification is not limited to flashing the icon in this manner. Other formats may be used as long as the user can visually recognize the change in the received operations, such as displaying other icons, changing the colors of the fine adjustment touch buttons 405 to 408, and so on. Furthermore, FIGS. 4C and 4D illustrate examples of a case where the user operates touch buttons. However, the user may be notified by displaying the "MF" icon in the display unit 111 and flashing the icon as described above even when the user operates the directional button 202 or the focus operation unit 128, which will be described later.

In step S328, the system control unit 101 determines whether the fine adjustment touch buttons 405 to 408 have been touched when the MF operation was executed. If the system control unit 101 has determined that the fine adjustment touch buttons have been pressed, the process moves to step S329. When such is not the case, the process moves to step S330.

In step S329, the system control unit 101 moves the focus position by one step. In step S330, the system control unit 101 determines whether the directional button 202 has been pressed. If the system control unit 101 has determined that the directional button has been pressed, the process moves to step S331. When such is not the case, the process moves to step S332.

In step S331, the system control unit 101 moves the focus position by one step. At this time, the key repeat determination is not carried out. Furthermore, in step S332, the system control unit 101 determines whether the focus operation unit 128 has been operated. The process moves to step S333 if it is determined that the unit has been operated, and to step S335 when such is not the case.

In step S333, the system control unit 101 moves the focus position by Y steps per unit angle. Here, the system control unit 101 sets the amount of focus movement for when the focus operation unit 128 is rotated to be lower than during the normal MF mode, in order to make the step number Y sufficiently lower than the step number X in step S318. This enables the user to make fine adjustments to the focus position. In step S334, the system control unit 101 determines whether the operation of the focus operation unit 128 has ended. If the operation has ended, the process returns to step S333, so that the focus position movement is carried out continuously while the focus operation unit 128 is being operated. However, if it is determined that the operation of the focus operation unit 128 has ended, the process moves to step S335.

In step S335, the system control unit 101 determines whether the first shutter switch 116 has been released. If the system control unit 101 has determined that the first shutter switch 116 has been released, the process moves to step S336. When such is not the case, the process moves to step S339.

In step S336, the system control unit 101 determines whether the second shutter switch 117 has been pressed. If it is determined that the second shutter switch 117 has not been pressed, the system control unit 101 returns the process to step S325 in order to carry out the fine MF focus adjustment until the first shutter switch 116 is released. On the other hand, if the system control unit 101 has determined that the second shutter switch 117 has been pressed, the process moves to step S337.

In step S339, the system control unit 101 determines whether the mode is temporarily the MF mode. If the mode is temporarily the MF mode, i.e., if the MF fine adjustment is being carried out even once, the system control unit 101 moves the process to step S340. In step S340, a process for returning the setting to the AF mode is carried out. On the other hand, if the mode is not the MF mode, the process returns to the processing carried out in the shooting standby state (i.e., to step S301).

In step S337, the system control unit 101 determines whether the mode is temporarily the MF mode. If the system control unit 101 has determined that the mode is temporarily the MF mode, the process moves to step S338. When such is not the case, the process moves to step S341. In step S338, the system control unit 101 carries out a process for returning the setting to the AF mode, and furthermore, in step S341, executes the shooting process.

According to the present embodiment as described thus far, when the focus is to be adjusted through MF after AF has been executed, user operations for making rough adjustments to the focus position are restricted, and only operations for making fine adjustments to the focus position are received. Doing so makes it possible to prevent erroneous operations in which the user roughly adjusts the focus position abruptly and mistakenly changes the focus position adjusted in the AF significantly. In other words, the occurrence of erroneous operations can be reduced during operations for adjusting the focus when using AF and MF together.

Although the present embodiment describes an example of making rough and fine adjustments to the focus position by operating the touch buttons 401 to 404 displayed in the display unit 111, those operations may be made using the rotational members, i.e., the controller wheel 204 and the electronic dial 205, instead. For example, the function for making rough adjustments to the focus position may be assigned to the electronic dial 205, and the function making fine adjustments to the focus position may be assigned to the controller wheel 204, with the focus position being adjusted by using those respective rotational members. In this case, after the AF is executed, the system control unit 101 invalidates operations of the electronic dial 205 for making rough adjustments to the focus position (e.g., ignores the operations). Alternatively, after the AF is executed, the function for making fine adjustments to the focus position may be assigned to the electronic dial 205, which had been used to make rough adjustments to the focus position. The occurrence of erroneous operations can be reduced in this manner as well.

Second Embodiment

Figure 7:
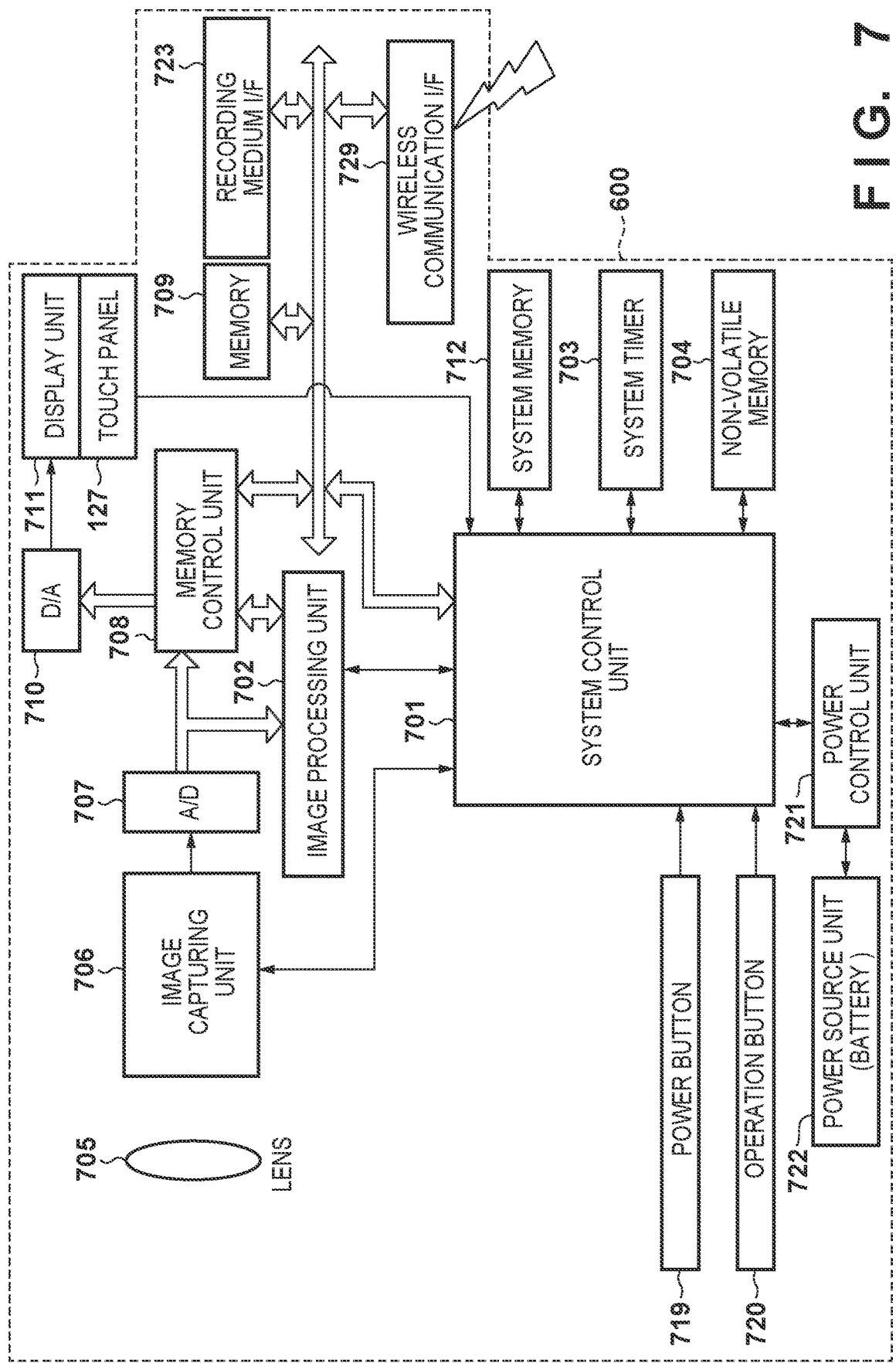
FIG. 7 is a block diagram illustrating an example of the functional configuration of a smartphone serving as an example of an image capturing control apparatus according to the second embodiment.

The first embodiment described an example in which the focus is adjusted by operating an operation member in the digital camera 100. The present embodiment, however, will describe an example in which the digital camera 100 is controlled by an external smartphone 600 through the wireless communication I/F 129. A sequence of operations for adjusting the focus according to the present embodiment will be described with reference to FIGS. 5A-1, 5A-2, 5B and 6A to 6C. In the following descriptions, "focus adjustment mode" refers to adjustment modes including a mode in which both the rough focus position adjustment and the fine focus position adjustment described in the first embodiment can be carried out (called a "normal adjustment mode" hereinafter), and a mode in which only the fine focus position adjustment can be carried out (called a "fine adjustment mode" hereinafter). The sequence of operations according to the present embodiment is realized by a system control unit 701 of the smartphone 600, which will be described later with reference to FIG. 7, loading programs, which are recorded in non-volatile memory 704, into system memory 712 and executing those programs.

In step S501, the system control unit 701 sets the focus adjustment mode to the normal mode in response to the shooting standby process of the digital camera 100 being started. In step S502, the system control unit 701 displays a normal adjustment screen in a display unit 711 of the smartphone 600. FIG. 6A illustrates an example of the normal adjustment screen displayed in the display unit 711 of the smartphone 600. An AF button 602 for instructing the digital camera 100 to execute AF, a shutter button 603 for instructing the digital camera 100 to shoot an image, rough adjustment touch buttons 604 and 605, and fine adjustment touch buttons 606 and 607 are displayed in the normal adjustment screen. The rough adjustment touch buttons 604 and 605 are buttons for moving the focus position at a large focus amount in response to even a small touch by the user. The fine adjustment touch buttons 606 and 607 are buttons for moving the focus position only a small amount upon being pressed by the user. A live view image 620 sent from the digital camera 100 is displayed in the normal adjustment screen.

In step S503, the system control unit 701 determines whether the shooting mode has been switched. During the shooting standby process, the system control unit 701 periodically determines whether the shooting mode has been switched. If it is determined that the shooting mode has been switched, the system control unit 701 ends the shooting standby process and ends the sequence of operations. When such is not the case, the system control unit 701 moves the process to step S504.

In step S504, the system control unit 701 determines whether the AF button 602 has been touched. The system control unit 701 periodically detects a touch made on the AF button 602 displayed in the display unit 711 of the smartphone 600 while standing by for shooting, and when it is determined that the AF button 602 has been touched, the process moves to step S505. When such is not the case, the process moves to step S510 to carry out the fine focus position adjustment.

In step S505, the AF button has been touched, and thus the system control unit 701 instructs the digital camera 100 to execute AF. The system control unit 701 sends the instruction to the digital camera 100 via a wireless communication I/F 729, for example. At this time, the system control unit 701 may receive a notification that the AF execution is complete from the digital camera 100 via the wireless communication I/F 729.

In step S506, the system control unit 701 determines that the current focus adjustment mode is the fine adjustment mode. The system control unit 701 may inquire with the digital camera 100 as to the current focus adjustment mode, or may synchronize the focus adjustment mode of the digital camera 100 with the focus adjustment mode managed by the system control unit 701. The system control unit 701 moves the process to step S509 if it is determined that the current focus adjustment mode is the fine adjustment mode, and to step S507 when such is not the case (i.e., if the current focus adjustment mode is the normal adjustment mode).

In step S507, the current focus adjustment mode is the normal adjustment mode, and thus the system control unit 701 changes the focus adjustment mode to the fine adjustment mode. In step S508, the system control unit 701 displays a fine adjustment screen, illustrated in FIG. 6B, in the display unit 711. In the fine adjustment screen, the rough adjustment touch buttons are hidden, and only the touch buttons 608 and 609, which are the fine adjustment touch buttons, are displayed. The system control unit 701 may change the rough adjustment touch buttons 604 and 605 to fine adjustment touch buttons, as illustrated in FIG. 6C, as a different example of a display for restricting the rough adjustment. In other words, the digital camera 100 is executing AF in response to the AF execution instruction in step S505, and thus the user of the smartphone 600 is restricted from making rough adjustments. At this time, the system control unit 701 may flash the "MF" icon in the same manner as in step S327, described with reference to FIG. 4C. In other words, the system control unit 701 may notify the user that the mode has temporarily switched to a dedicated mode for fine focus position adjustment and that the focus position will not move even if the rough adjustment touch buttons 604 and 605 are operated. In step S509, the system control unit 701 resets a timer set by a system timer 703 for the fine adjustment mode, and then starts the timer again.

Next, in step S510, the system control unit 701 determines whether or not the current focus adjustment mode is the fine adjustment mode. The system control unit 701 moves the process to step S515 if it is determined that the focus adjustment mode is the fine adjustment mode, and to step S511 when such is not the case (i.e., if the focus adjustment mode is the normal adjustment mode).

In step S511, the system control unit 701 determines whether the rough adjustment touch button 604 or 605 has been touched while in the normal adjustment mode. If it has been determined that the rough adjustment touch button has been touched, in step S515, the system control unit 701 instructs the digital camera 100 to move the focus position by N steps, via the wireless communication I/F 729. When such is not the case, the process moves to step S513.

In step S513, the system control unit 701 determines whether the fine adjustment touch buttons have been touched. If the fine adjustment touch buttons have been touched, the process moves to step S514. When such is not the case, the process moves to step S518. In step S514, the system control unit 701 instructs the digital camera 100 to move the focus position by one step, via the wireless communication I/F 729.

On the other hand, if the focus adjustment mode is the fine adjustment mode, in step S515, the system control unit 701 determines whether the fine adjustment touch buttons 608 to 611 have been touched. If the touch has been detected, the process moves to step S516, whereas when such is not the case, the process moves to step S518.

In step S516, the system control unit 701 extends the timer for the fine adjustment mode, and in step S517, instructs the digital camera 100 to move the focus position by one step, via the wireless communication I/F 729.

In step S518, the system control unit 701 again determines whether the focus adjustment mode is the fine adjustment mode. The process moves to step S519 if the focus adjustment mode is the fine adjustment mode, and to step S513 when such is not the case. In step S519, the system control unit 701 determines whether the timer for the fine adjustment mode has expired. If the timer has expired, in step S520, the timer is reset. On the other hand, if the timer has not expired, the process moves to step S523. In step S521, the system control unit 701 returns (changes) the focus adjustment mode to the normal adjustment mode, and in step S522, returns (changes) the screen displayed in the display unit 711 to the normal adjustment screen.

In step S523, the system control unit 701 determines whether the shutter button 603 has been touched. If it has been determined that the shutter button 603 has been touched, the system control unit 701 moves the process to step S524, and returns the process to step S503 when such is not the case. In step S524, the system control unit 701 instructs the digital camera 100 to carry out the shooting process. The system control unit 701 sends the instruction to the digital camera 100 via the wireless communication I/F 729. At this time, the system control unit 701 may receive a notification that the shooting process is complete from the digital camera 100 via the wireless communication I/F 729.

In step S525, the system control unit 701 determines the focus adjustment mode after the shooting process. If it is determined that the focus adjustment mode is the fine adjustment mode, the system control unit 701 moves the process to step S526, and returns the process to step S503 when such is not the case.

In step S526, the system control unit 701 resets the timer for the fine adjustment mode set by the system timer 703, and in step S527, returns (changes) the focus adjustment mode to the normal adjustment mode. The system control unit 701 furthermore displays the normal adjustment screen in the display unit 711, and then returns the process to step S503, which is the start of the shooting standby process.

Note that the foregoing describes an example of a sequence of operations in which the system control unit 701 changes the focus adjustment mode from within the smartphone 600. However, the system control unit 701 may send instructions via the wireless communication I/F 729 so that each time the above-described focus adjustment mode is changed, the focus adjustment mode changes on the digital camera 100 side.

An example of the functional configuration of the smartphone 600 capable of executing the above-described sequence of operations for adjusting the focus will be described next.

A shooting lens 705 is an optical imaging system that conducts light beams from a subject to an image capturing unit 706. The image capturing unit 706 is an image sensor constituted by a CCD, a CMOS element, or the like that converts an optical image into an electrical signal. An A/D converter 707 includes a circuit that converts analog signals into digital signals, and converts an analog image signal output from the image capturing unit 706 into a digital signal and outputs the digital signal.

An image processing unit 702 carries out prescribed pixel interpolation, resizing processing such as reduction, color conversion processing, and the like on data from the A/D converter 707 or data from a memory control unit 708.

Data output from the A/D converter 707 is written directly into memory 709 through the image processing unit 702 and the memory control unit 708, or through the memory control unit 708. The memory 709 stores the image data obtained by the image capturing unit 706 and converted into digital data by the A/D converter 707, image data for display in a display unit 711, and the like. The memory 709 is provided with a storage capacity sufficient to store a predetermined number of still images, a predetermined time's worth of moving images, and so on.

The memory 709 also functions as image display memory (video memory). A D/A converter 710 converts data for image display, stored in the memory 709, into an analog signal and supplies the analog signal to the display unit 711. Image data for display written into the memory 709 thus displayed by the display unit 711 via the D/A converter 710 in this manner.

The display unit 711 carries out a display in the display device, which is an LCD or the like, based on the analog signal from the D/A converter 710. The smartphone 600 uses the D/A converter 710 to convert digital signals, which have been received from the digital camera 100 via the wireless communication I/F 729 and stored in the memory 709, into analog signals, and sequentially transfers and displays those signals in the display unit 711. A live view display captured by the digital camera 100 can be carried out as a result.

A touch panel 727 is capable of detecting contact made with the display unit 711, and the touch panel 727 and the display unit 711 can be configured as an integrated unit. For example, the touch panel 727 is configured having a light transmittance that does not interfere with the display of the display unit 711, and is attached to the upper layer of the display surface of the display unit 711. An input coordinate system of the touch panel 727 is then associated with a display coordinate system of the display unit 711. This makes it possible to configure a GUI that makes the user feel as if he or she can directly manipulate the screen displayed in the display unit 711.

The non-volatile memory 704 is memory that can be recorded to and erased electrically, and is constituted by, for example, EEPROM or the like. Operational constants, programs, and so on of the system control unit 701 are stored in the non-volatile memory 704. "Programs" as mentioned here refers to programs for executing the above-described flowcharts according to the present embodiment.

The system control unit 701 controls the smartphone 600 as a whole.

The above-described respective processes according to the present embodiment are realized by loading programs, which are recorded in the non-volatile memory 704 mentioned above, into the system memory 712 and executing those programs. The system control unit 701 also carries out display control by controlling the memory 709, the D/A converter 710, the display unit 711, and so on. The system memory 712 includes volatile memory such as DRAM, and temporarily stores operational constants and variables for the system control unit 701, programs read out from the non-volatile memory 704, and so on. The system timer 703 is a time measurement unit that measures times used in various types of control, measures the time of an internal clock, and so on.

A power button 719 and an operation unit 720 are operation members for inputting various types of operating instructions to the system control unit 701. A power control unit 721 is constituted by a battery detection circuit, a DC-DC converter, switch circuits for switching the blocks through which power passes, and so on, and detects the state of the power button 719, whether or not a battery is connected, the type of the battery, the remaining battery power, and so on. The power control unit 721 also controls the DC-DC converter based on the detection results and instructions from the system control unit 701, and supplies a necessary voltage for a necessary period to the various units, including a recording medium 723.

A power source unit 722 is a primary battery such as an alkali battery, a lithium battery, or the like, a secondary battery such as a NiCd battery, a NiMH battery, a Li battery, or the like, an AC adapter, and so on. The present embodiment describes an example in which a secondary battery is used as the power source unit (called a "battery" hereinafter).

The recording medium 723 is a recording medium for recording shot images, such as a memory card or the like, and is constituted by semiconductor memory, a magnetic disk, or the like.

The wireless communication I/F 729 can communicate wirelessly with an external device. This makes it possible to receive data shot by the digital camera 100, a PC, or the like, control the shooting of the digital camera 100 from the smartphone 600, and so on.

According to the present embodiment as described thus far, when adjusting the focus of the digital camera 100 from the smartphone 600, user operations for making rough adjustments to the focus position are restricted from being received after AF is executed. In other words, when adjusting the focus through MF after the digital camera 100 has executed AF, the smartphone 600 receives only operations for making fine adjustments to the focus position. Doing so makes it possible to prevent erroneous operations in which the user roughly adjusts the focus position abruptly and mistakenly changes the focus position adjusted in the AF significantly, even when performing the operations remotely. In other words, the occurrence of erroneous operations can be reduced during operations for adjusting the focus when using AF and MF together.

In the present embodiment, the mode is restored from the fine adjustment mode to the normal adjustment mode in step S521 after a prescribed amount of time has passed following the MF operation carried out after the instruction to execute AF or the instruction to carry out the shooting process. However, the method is not limited thereto. For example, a fine adjustment mode cancel button may be displayed in the screen so that the user can return the mode to the normal adjustment mode at any desired time. Employing such a configuration makes it possible to apply the present invention even in a case where it is not clear whether the mode is the AF mode or the MF mode, and AF operations and MF operations can be executed simultaneously.

Additionally, the present embodiment describes an example in which the focus adjustments are made using the touch panel of the smartphone 600. However, if the smartphone 600 includes operation members, focus adjustment similar to that described in the first embodiment can also be carried out by operating those operation members.

Note that the above-described various types of control performed by the system control unit 101 or 701 may be carried out by a single piece of hardware, or the control of the apparatus as a whole may be carried out by dividing the processing up among multiple pieces of hardware (e.g., multiple processors or circuits).

Although the foregoing has described preferred embodiments of the present invention, the present invention is not intended to be limited to the specific embodiments, and all variations that do not depart from the essential spirit of the invention are intended to be included in the scope of the present invention. Furthermore, the above-described embodiments are merely embodiments of the present invention, and different embodiments can be combined as appropriate.

Although the foregoing embodiments describe examples in which the present invention is applied in an image capturing control apparatus, the present invention is not limited to this example, and can be applied in any image capturing control apparatus capable of receiving AF execution instructions and NIF operations. The present invention can be applied in, for example, personal computers, PDAs, mobile image viewers, digital photo frames, game consoles, and the like.

Furthermore, the second embodiment describes an example in which the present invention is applied in a smartphone serving as an example of an image capturing control apparatus that remotely controls an image capturing apparatus. However, the apparatus that remotely controls the image capturing apparatus may be, for example, a tablet PC, a desktop PC, a wristwatch-type information terminal, or the like, and furthermore may be a dedicated remote controller connected to the camera by wire or wirelessly.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-160598, filed Aug. 29, 2018, which is hereby incorporated by reference herein in its entirety.

What is claimed is:

1. An image capturing control apparatus comprising:
an autofocus (AF) instruction switch configured to receive an instruction to carry out autofocus (AF); and
at least one memory and at least one processor which function as:
a display control unit configured to control a display of a first display item and a second display item that receive instructions to adjust a focus amount, as a manual focus (MF) operation; and
a control unit configured to carry out control so that:
in an MF operation carried out before AF, a focus position is moved by a first focus amount in response to the first display item being operated, and the focus position is moved by a second focus amount greater than the first focus amount in response to the second display item being operated; and
in an MF operation carried out after the AF, the focus position is moved by the first focus amount in response to the first display item being operated, and the focus position is not moved in response to the second display item being operated, or the second display item is not displayed.

2. The image capturing control apparatus according to claim 1, further comprising:
a communication interface configured to communicate with an external image capturing apparatus,
wherein the control unit controls the communication by the communication interface so that the image capturing apparatus moves the focus position by the first focus amount or the second focus amount.

3. The image capturing control apparatus according to claim 1,
wherein the memory and at least one processor further function as a notification unit configured to notify a user that the focus position will not move when the control unit carries out control so that the focus position is not moved by the MF operation carried out after the AF.

4. The image capturing control apparatus according to claim 3,
wherein the notification unit makes the notification in a format that enables the user to visually recognize a change in the operation that will be received.

5. The image capturing control apparatus according to claim 1, further comprising:
a mode switching member configured to switch between an AF mode and an MF mode,
wherein the MF operation carried out before AF is an MF operation carried out while switched to the MF mode; and
wherein the MF operation carried out after the AF is an MF operation carried out when, after AF has been carried out in response to an instruction to carry out the AF while in a state where the mode switching member is switched to the AF mode, the instruction to carry out AF continues without the mode switching member switching to the MF mode.

6. The image capturing control apparatus according to claim 5,
wherein the control unit carries out control so that when the mode switching member is switched to the AF mode, the focus position is not moved in response to the MF operation carried out before the instruction to carry out AF.

7. A method for controlling an image capturing control apparatus that comprises an auto focus (AF) instruction switch that receives an instruction to carry out autofocus (AF), the method comprising:
controlling a display of a first display item and a second display item that receive an instruction to adjust a focus amount, as a manual focus (MF) operation; and
carrying out control so that:
in an MF operation carried out before AF, a focus position is moved by a first focus amount in response to the first display item being operated, and the focus position is moved by a second focus amount greater than the first focus amount in response to the second display item being operated; and
in an MF operation carried out after the AF, the focus position is moved by the first focus amount in response to the first display item being operated, and the focus position is not moved in response to the second display item being operated, or the second display item is not displayed.

8. A non-transitory computer-readable storage medium storing a program for causing a computer to execute a method for controlling an image capturing control apparatus, the apparatus comprising an auto focus (AF) instruction switch that receives an instruction to carry out autofocus (AF), the method comprising:
controlling a display of a first display item and a second display item that receive an instruction to adjust a focus amount, as a manual focus (MF) operation; and
carrying out control so that:
in an MF operation carried out before AF, a focus position is moved by a first focus amount in response to the first display item being operated, and the focus position is moved by a second focus amount greater than the first focus amount in response to the second display item being operated; and
in an MF operation carried out after the AF, the focus position is moved by the first focus amount in response to the first display item being operated, and the focus position is not moved in response to the second display item being operated, or the second display item is not displayed.

9. An image capturing control apparatus comprising:
an autofocus (AF) instruction switch configured to receive an instruction to carry out autofocus (AF);
a first operation member and a second operation member configured to adjust a focus amount, as a manual focus (MF) operation; and
at least one memory and at least one processor which function as:
a control unit configured to carry out control so that:
in an MF operation carried out before AF, a focus position is moved by a first focus amount in response to the first operation member being operated, and the focus position is moved by a second focus amount greater than the first focus amount in response to the second operation member being operated; and
in an MF operation carried out after AF, the focus position is moved by the first focus amount in response to the first operation member being operated, and the focus position is not moved in response to the second operation member being operated.

10. A method for controlling an image capturing control apparatus, the image capturing control apparatus comprising an auto focus (AF) instruction switch that receives an instruction to carry out autofocus (AF), and a first operation member and a second operation member that adjust a focus amount as a manual focus (MF) operation, the method comprising:
carrying out control so that:
in an MF operation carried out before AF, a focus position is moved by a first focus amount in response to the first operation member being operated, and the focus position is moved by a second focus amount greater than the first focus amount in response to the second operation member being operated; and
in an MF operation carried out after AF, the focus position is moved by the first focus amount in response to the first operation member being operated, and the focus position is not moved in response to the second operation member being operated.

11. An image capturing control apparatus comprising:
an autofocus (AF) instruction switch configured to receive an instruction to carry out autofocus (AF);
a first operation member configured to adjust a focus amount, as a manual focus (MF) operation; and
at least one memory and at least one processor which function as:
a control unit configured to carry out control so that:
in an MF operation carried out before AF, a focus position is moved by a first focus amount in response to the first operation member being operated by a specific operation amount; and
in an MF operation carried out after AF, the focus position is moved by a second focus amount less than the first focus amount in response to the first operation member being operated by the specific operation amount.

12. The image capturing control apparatus according to claim 11,
wherein the memory and at least one processor further function as a notification unit configured to notify a user that the focus position will move by the second focus amount when the control unit carries out control so that the focus position is moved by the second focus amount in response to the operation by the specific operation amount.

13. The image capturing control apparatus according to claim 12,
wherein the notification unit makes the notification in a format that enables the user to visually recognize a change in the operation that will be received.

14. A method for controlling an image capturing control apparatus, the image capturing control apparatus comprising an auto focus (AF) instruction switch that receives an instruction to carry out autofocus (AF), and a first operation member that adjusts a focus amount as a manual focus (MF) operation, the method comprising:
carrying out control so that:
in an MF operation carried out before AF, a focus position is moved by a first focus amount in response to the first operation member being operated by a specific operation amount; and
in an MF operation carried out after AF, the focus position is moved by a second focus amount less than the first focus amount in response to the first operation member being operated by the specific operation amount.

* * * * *